United States Patent
Lindström

(10) Patent No.: US 9,633,783 B2
(45) Date of Patent: Apr. 25, 2017

(54) TRANSMISSION OF SIGNALS THROUGH A NON-CONTACT INTERFACE

(71) Applicant: ATLAS COPCO INDUSTRIAL TECHNIQUE AB, Stockholm (SE)

(72) Inventor: Lars Håkan Verner Lindström, Trangsund (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 392 days.

(21) Appl. No.: 14/395,050

(22) PCT Filed: Apr. 26, 2013

(86) PCT No.: PCT/EP2013/058729
§ 371 (c)(1),
(2) Date: Oct. 16, 2014

(87) PCT Pub. No.: WO2013/164265
PCT Pub. Date: Nov. 7, 2013

(65) Prior Publication Data
US 2015/0069852 A1    Mar. 12, 2015

(30) Foreign Application Priority Data
May 3, 2012 (SE) .................................... 1250444

(51) Int. Cl.
*H01F 27/42* (2006.01)
*H01F 38/00* (2006.01)
(Continued)

(52) U.S. Cl.
CPC ............ *H01F 38/18* (2013.01); *H01F 38/14* (2013.01); *H02H 9/042* (2013.01);
(Continued)

(58) Field of Classification Search
USPC ......................................................... 307/104
See application file for complete search history.

(56) References Cited

U.S. PATENT DOCUMENTS

2006/0041420 A1    2/2006  Martin et al.
2006/0252370 A1   11/2006  Goossens et al.
(Continued)

FOREIGN PATENT DOCUMENTS

SE        529678 C2     10/2007
WO     2005015766 A1     2/2005
WO     2006004990 A2     1/2006

OTHER PUBLICATIONS

International Search Report (ISR) and International Preliminary Report on Patentability (IPRP) dated Jul. 25, 2013 issued in International Application No. PCT/EP2013/058729.
(Continued)

*Primary Examiner* — Jared Fureman
*Assistant Examiner* — Dru Parries
(74) *Attorney, Agent, or Firm* — Holtz, Holtz & Volek PC

(57) ABSTRACT

A bi-directional transmission system for transmission of signals through a non-contact interface includes a transformer inductively coupling a first circuit to a second circuit. The second circuit includes at least a first transmitter circuit arranged to translate a first digital input signal into at least one voltage pulse and to provide the at least one voltage pulse to a first winding of the transformer, wherein the at least one voltage pulse takes a positive or negative form based on whether the first digital input signal has a positive or negative edge. The first circuit includes at least a first receiver circuit arranged to receive at least one induced voltage pulse from a second winding of the transformer and to provide a first digital output signal reflecting the first digital input signal based on the at least one induced voltage pulse.

20 Claims, 8 Drawing Sheets

(51) Int. Cl.
  *H01F 38/18* (2006.01)
  *H04B 5/00* (2006.01)
  *H01F 38/14* (2006.01)
  *H02H 9/04* (2006.01)

(52) U.S. Cl.
  CPC ......... *H04B 5/0031* (2013.01); *H04B 5/0037* (2013.01); *H04B 5/0081* (2013.01); *H01F 2038/143* (2013.01)

(56) References Cited

U.S. PATENT DOCUMENTS

| | | |
|---|---|---|
| 2009/0196388 A1 | 8/2009 | Fukaishi et al. |
| 2009/0243683 A1 | 10/2009 | Ochi et al. |
| 2012/0007438 A1 | 1/2012 | Kuroda |
| 2013/0135024 A1 | 5/2013 | Ochi et al. |

OTHER PUBLICATIONS

International-Type Search Report dated Oct. 22, 2012 issued in Swedish Application No. 1250444-5.

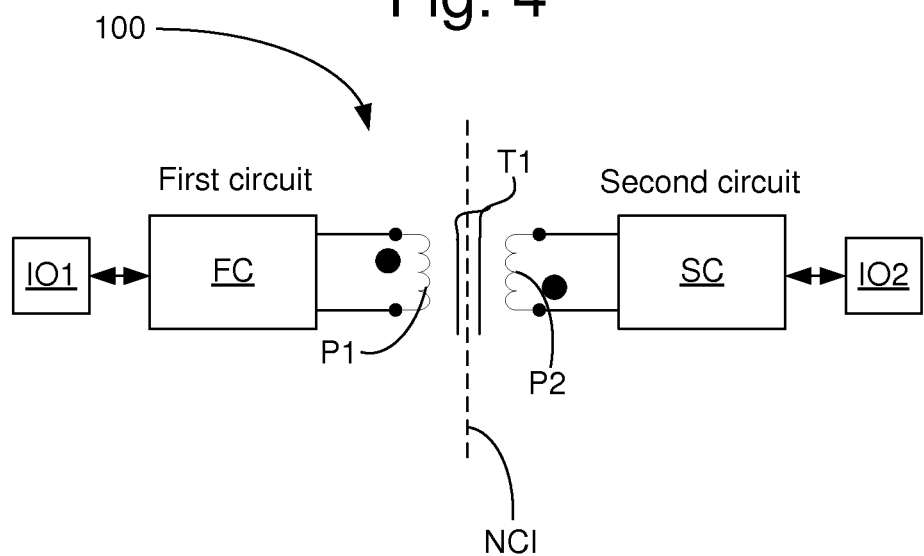
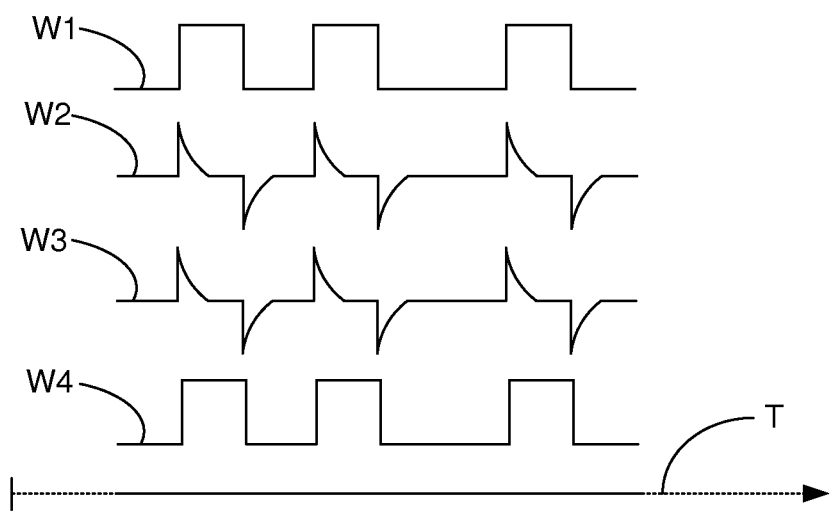

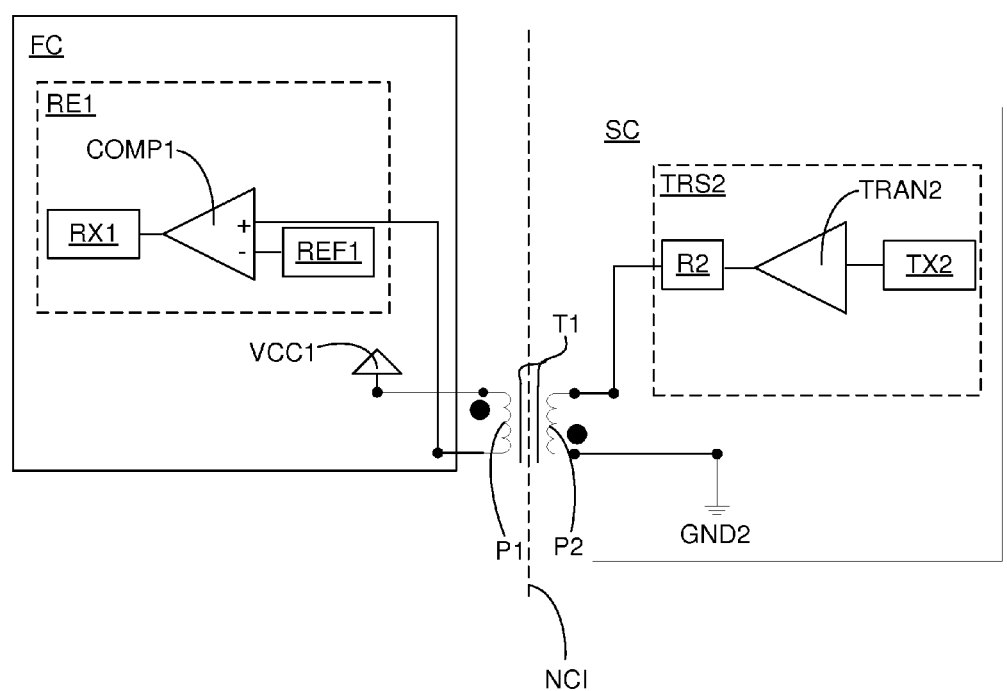

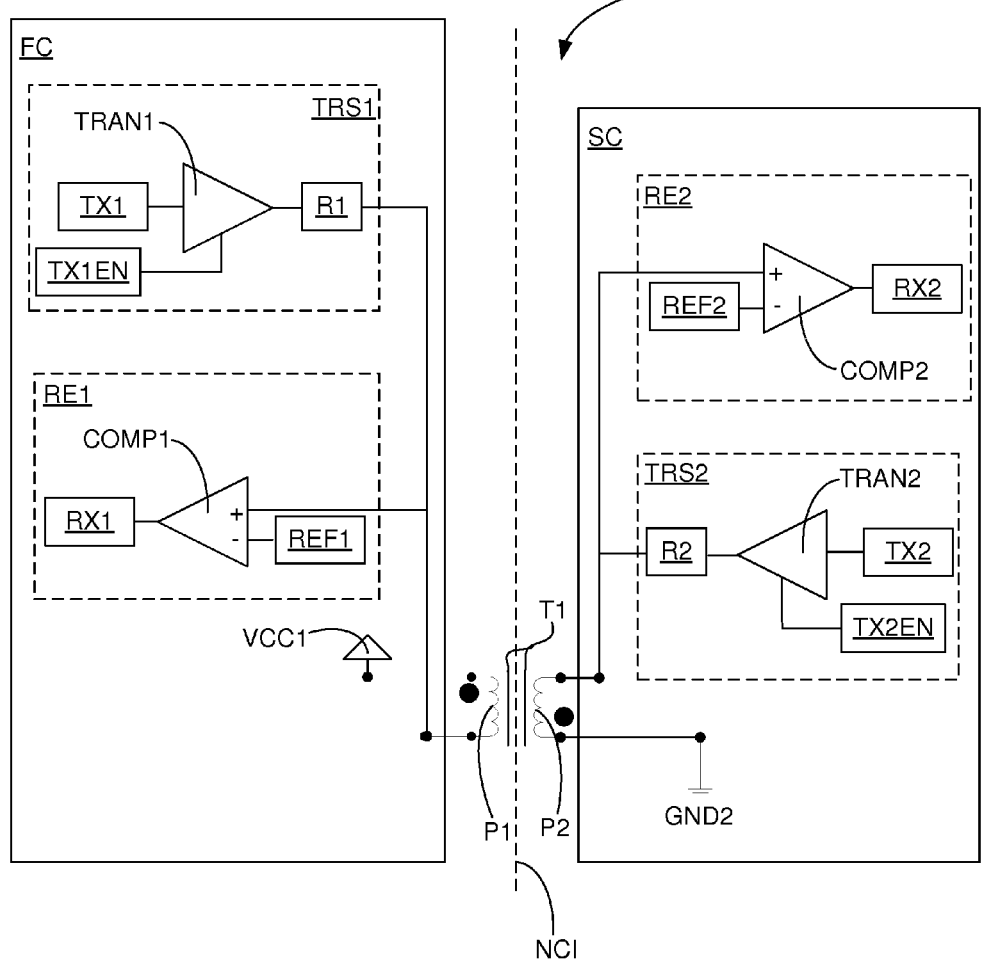

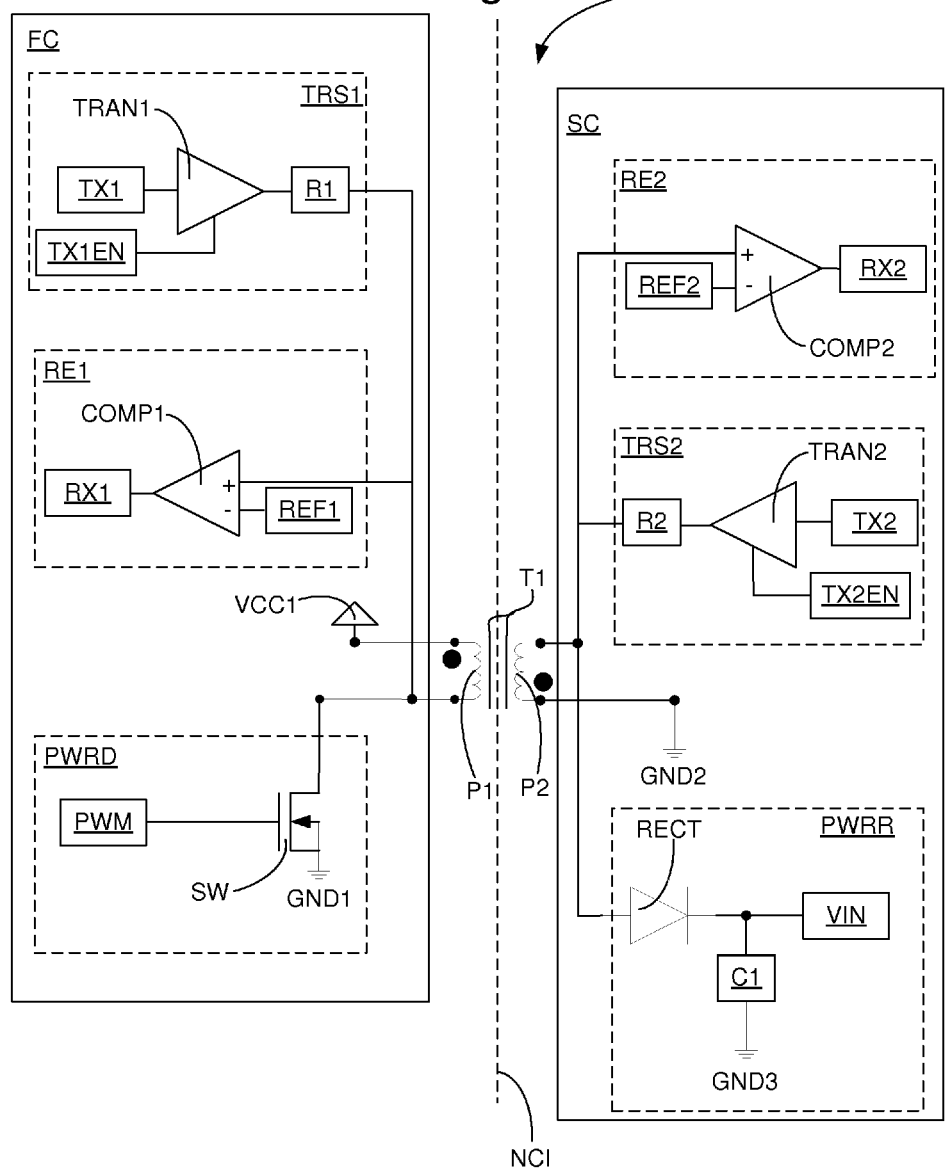

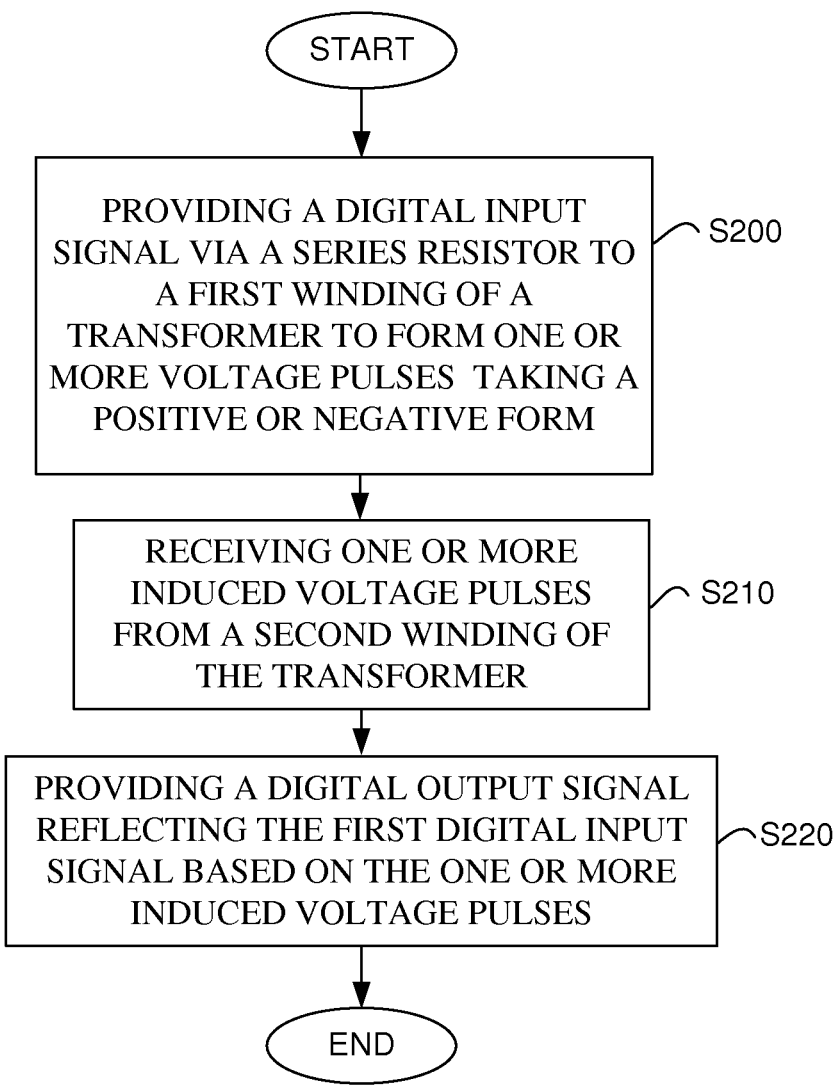

TRANSMISSION OF SIGNALS THROUGH A NON-CONTACT INTERFACE

TECHNICAL FIELD

The present invention relates to a transmission device for transmission of signals through a non-contact interface and a method for a transmission of signals through a non-contact interface.

The present invention relates in particular to a transmission device for transmission of signals through a non-contact interface using a transformer and a method for transmission of signals through a non-contact interface using a transformer associated with power tools.

In this application a non-contact interface signifies an interface in which communication is, at least for some part, performed wirelessly.

BACKGROUND

Different transmission arrangements are used today throughout a variety of different systems for wireless transmission of data.

Wireless data transmission procedures using for example transformers typically involve modulation or coding. Coding and/or modulation is typically introduced to enable transmission of data and/or to enable detection of transmitted data and/or to prevent saturation of the transformer core by the data, i.e. to prevent excessive voltages from being applied to the transformer. Normally, to prevent saturation of the transformer, a balance type code is used. An example of such a code is the Manchester code which always returns to zero after each clock cycle. The Manchester code has a mean voltage value of zero over time. Ethernet transformers typically use Manchester coding.

One area within which wireless communication is gaining interest is within the area of telemetry, i.e. communication of measurement data and/or other signals associated thereto.

A typical application that involves a non-contact interface is a system involving a rotating device, to which communication may not be achieved by wire. In systems involving a rotating device there is however often a need for measuring one or more characteristics associated with the rotating device, such as for example the torque experienced by the rotating device, the temperature of said rotating device, the mechanical wear/stress of said rotating device and/or the angular velocity of said rotating device. Said measured characteristics can for example be used for one or more of the following purposes: controlling/monitoring the means used for applying rotation to said rotating device, monitoring one or more characteristic of the rotating device in order to assure that control reference values are followed by the rotating device, and to assure that no tolerance values associated with the rotating device are exceeded.

In some applications, contact-less sensors, i.e. sensors distantly positioned from a measurement object such as said rotating device, can be used for measurement of characteristics of the rotating device. However, in some applications contact-less sensors are unsuitable due to their limited accuracy. For applications wherein contact-less sensors are unsuitable, contact sensors contacting the measurement object have to be used instead.

Known systems for measuring one or more characteristics of a rotating device using one or more contact sensor are typically reliant on a wireless telemetry arrangement in order to retrieve data from the one or more contact sensor since performing measurements on a rotating device using one or more contact sensor implicates the one or more contact sensors rotating together with the rotating device, which presents difficulties with attaching wires to said one or more sensor.

A slip ring arrangement is an example of a known arrangement for providing a wireless connection from a rotating sensor, such as a rotating torque sensor, to receiving electronics. The slip ring arrangement consists of a number of conductive rings that rotate with the sensor, and a number of brushes that contact said conductive rings, rendering possible the transmission of measurement data to the receiving electronics.

Another known approach for transmission of measurement data from a rotating sensor is the use of an RF (radio frequency) transmitter, such as a FM transmitter sending a frequency modulated signal, wherein said RF transmitter is coupled to the rotating sensor for wireless transmission of the data to receiving electronics.

Another known approach for transmission of measurement data from a rotating sensor is the use of a rotary transformer. The rotary transformer is a specialized transformer used to couple electrical signals between two parts which rotate in relation to each other. The rotary transformer is coupled to transmit power to the rotating sensor. An external instrument provides an excitation voltage to a strain gauge bridge via an excitation transformer. The sensor strain gauge bridge then drives a second rotary transformer coil so as to receive a measurement signal from the rotating sensor.

Yet another known approach for providing wireless transmission of measurement data from a rotating sensor, such as a torque sensor, is the use of an IR torque sensor. Similarly to the rotary transformer approach described above the IR torque sensor draws power through a rotary transformer coupling. The IR torque sensor differs from the above rotary transformer approach in that measurement data from the IR torque sensor is transmitted via infrared light to stationary receiving diodes of receiving electronics.

However, the transmission arrangements including telemetry systems for providing wireless signal transmission according to prior art tends to suffer from one or more of the following drawbacks: require complex circuit(s) and/or large sized circuit(s) configuration(s), high power consumption, difficult to maintain, costly to build, limited bandwidth for signal transmission, limited transmission capabilities, and prone to wear.

Accordingly, there is a need to present improvements in the art of wireless signal transmission.

DESCRIPTION OF THE INVENTION

One object with the present invention is to provide a transmission device and an associated method for transmission of signals through a non-contact interface, capable of wireless bi-directional communication at high data rates.

One object is further to provide a transmission device and method for transmission of signals through a non-contact interface, which is capable of transmitting both signals and power over the non-contact interface.

One object is further to provide a small-sized transmission device for transmission of signals through a non-contact interface, not requiring much space on any side of the non-contact interface.

Yet an additional object is to provide a transmission device and associated method that are less complicated and less costly than known techniques according to the prior art.

One or more of these objects are achieved by a transmission system for transmission of signals through a non-contact interface, according to the present invention as defined in claim 1, which comprises a transformer inductively coupling a first circuit to a second circuit through the non-contact interface. The second circuit comprises a first transmitter circuit having a first digital transmitter arranged to provide a first digital input signal via a first resistor to a first winding of the transformer, whereby one or more voltage pulses are formed in said first winding. The one or more voltage pulses take a positive or negative form based on if the first digital input signal has a positive or negative edge. The first circuit comprises a first receiver circuit having a first comparator arranged to receive one or more induced voltage pulses from a second winding of said transformer, induced by the one or more voltage pulses in the first winding, and to provide a first digital output signal reflecting said first digital input signal based on said one or more induced voltage pulses.

By this is achieved a transmission system capable of uni-directional transmission of digital signals through a non-contact interface that can be implemented without the use of a coder/de-coder and/or modulator/de-modulator associated to the transmitter and receiver respectively.

This is accomplished by means of providing the digital signal to be transferred via the resistor to the first winding of the transformer. Upon providing said digital signal from said first digital transmitter via the resistor to the first winding the digital signal is transformed into positive and negative pulses over the first winding due to the inductance. Positive pulses are formed when a rising edge of the first digital signal is provided by the first digital transmitter i.e. appears at an output of the first digital transmitter, by means of that the voltage over the transformer winding will immediately rise as the initial current is zero in an inductor and then the voltage will decrease as the current increases in the inductor. After a short period of time the current will be limited by the series resistor and the voltage over the winding will be close to zero again. The voltage drop will be over the series resistor instead. A falling edge of the first digital signal provided by the first digital transmitter will similarly cause a negative voltage pulse over the winding. Accordingly, the transmission system of the present invention is capable of performing transmissions wirelessly without applying coding and/or modulation techniques. Furthermore, very few components are involved in shaping said pulses.

By alleviating the transmission system from the need of coding/modulation components this provides advantages in terms of circuit complexity, circuit size, data transfer rate, power consumption and costs associated with constructing and designing the transmission system.

The transmission system is in one option further characterized in that, the first comparator has an integrated hysteresis so as to introduce separate switching points for the one or more induced voltage pulses having a positive form and for the one or more induced voltage pulses having a negative form.

By this is achieved a transmission system wherein the receiver circuit can be realized using few components. Hysteresis is normally added to a comparator for de-sensitizing the comparator from noisy input voltages. However, by configuring the level of added hysteresis appropriately a single comparator is enabled to change its output state to either a logical "1" or a logical "0" both when a voltage pulse having a positive form and when a voltage pulse having a negative form appear at the input terminal of the comparator by means of introducing two switching points i.e. voltage levels across which the comparator changes its output state. This provides advantages in terms of circuit complexity, circuit size, power consumption and costs associated with constructing the transmission system since the receiver circuit can be constructed using a single active component i.e. a single comparator with added hysteresis.

The transmission system is in one option further characterized in that, said transmission system is a bi-directional transmission system and in that the first circuit comprises a second transmitter circuit having second digital transmitter arranged to provide a second digital input signal via a second resistor to the second winding of the transformer. The one or more voltage pulses take a positive or negative form based on if said other digital input signal has a positive or negative edge. In this option the second circuit further comprises a second receiver circuit having a second comparator arranged to receive one or more induced voltage pulses from the first winding of said transformer, induced by said one or more voltage pulses in the second winding, and to provide a second digital output signal reflecting said second digital input signal based on said one or more induced voltage pulses.

By this is achieved a transmission system capable of bi-directional transmission of signals at high data rates.

The transmission system is in one option further characterized in that at least one of the first digital transmitter and the second digital transmitter comprises a logic buffer.

The transmission system is in one option further characterized in that
the first and/or second digital transmitter comprises tri-state logic to enable the first and/or second digital transmitters to assume a high impedance state when not transmitting signals and wherein the first and/or second digital transmitters comprise a transmit enable input for disabling the high impedance state when transmitting digital signals.

By this is achieved a transmission system wherein the use of bi-directional transmission do not disturb transmission of digital signals. By means of allowing one or more of the digital transmitters to assume the high impedance state (Hi-Z) the influence of the one or more digital transmitter set in the high impedance state can be removed from the rest of the circuit i.e. the receiver circuit and the transmitter circuit of each of the first and second circuit can share a single input node without adversely affecting the operation related to receiving signals and transmitting signals. Furthermore, power consumption is reduced since less power is consumed by the digital transmitters when set in the high impedance state.

The transmission system is in one option further characterized in that said transmission system further is arranged for transmission of power through said non-contact interface.

By this is achieved a transmission system wherein one of the first or second circuit can operate independent of a dedicated power supply i.e. one of the first or second circuit can provide power to the other circuit. This is advantageous for applications wherein one of the first or second circuit is mounted in a location where a cabled power supply is unsuitable due to for example one of the circuits rotate in relation to the other circuit or when a replaceable power source such as a battery is unsuitable due to size or requiring disassembly procedures.

The transmission system is in one option further characterized in that said transmission system is arranged to alternate between transmission of power from the first circuit to the second circuit, and transmission of digital signals at least from the second circuit to the first circuit.

By this is achieved a transmission system capable of both wireless power transmission and at least uni-directional wireless transmission of digital signals such as half-duplex bi-directional transmission of digital signals, which can be realised without using complex circuits and/or without limiting the bandwidth for transmission of digital signals. This is accomplished by means of alternating between power transmission and transmission of digital signals. This is advantageous in terms of circuit size, circuit complexity, data rate. This is further advantageous for the cost associated to the transmission system.

The transmission system is in one option further characterized in that said transmission system is arranged to alternate between transmission of digital signals and transmission of power based on a time-slot scheme.

By this is achieved a transmission system capable of both wireless power transmission and at least uni-directional wireless transmission of digital signals such as half-duplex bi-directional transmission of digital signals, wherein the alternation by means of the time-slot scheme is controllable and therefore also predictable, configurable and reliable.

The transmission system is in one option further characterized in that said transmission system is arranged to trigger switching from transmission of power to transmission of digital signals, or vice versa, based on the characteristics of one or more power pulses transmitted during transmission of power over the non-contact interface.

By this is achieved a transmission system wherein alternating between at least uni-directional transmission of digital signals and power transmission or alternating between half-duplex bi-directional transmission of digital signals and power transmission is possible independently of dedicated digital signals in the form of control commands being transmitted between the first and second circuit and independently of both the first and second circuit having clock synchronization to coordinate alternation of power transmission and sending/receiving operations.

The transmission system is in one option further characterized in that the first circuit comprises a power driver circuit having a first switch for switching on and off a voltage to the primary winding of the transformer during transmission of power from the first circuit to the second circuit, said power driver circuit further comprising a snubber circuit to protect at least one of the second digital transmitter and the first switch of the first circuit from voltage spikes when said switch is turned off.

By this is achieved a transmission system wherein the digital transmitter can be implemented using low grade components having less tolerance against voltage spikes as compared to high grade transistors whereby the transmitter circuit can be constructed in a cost efficient manner. Apart from protecting the switch from voltage spikes the snubber circuit also introduces a resonance which increases the efficiency of power transmission and facilitates implementing the time-slot scheme since the snubber circuit reduces the transient behavior of the one or more power pulses of the power transmission.

The transmission system is in one option further characterized in that the power driver circuit comprises a second switch for disabling the snubber circuit during transmission of digital signals from the second circuit to the first circuit, and enabling the snubber circuit during transmission of power from the first circuit to the second circuit.

By this is achieved a transmission system the implementation of the snubber circuit do not disturb transmission of digital signals. By means of disabling the snubber circuit during transmission of digital signals the snubber circuit assumes a high impedance state (Hi-Z) whereby influence of the snubber circuit is removed or at least reduced from the rest of the circuit so as to avoid adversely affecting the operation related to receiving signals and transmitting signals.

The transmission system is in one option further characterized in that the snubber circuit comprises at least one of: an RC circuit comprising at least one resistor and at least one capacitor, and a diode, such as a transient voltage suppression diode.

The transmission system is in one option further characterized in that the non-contact interface is a rotating non-contact interface and wherein the transformer is a rotary transformer.

By this is achieved a transmission system capable of transmission of digital signals and/or power transmission through the non-contact interface where the interface is rotates.

The transmission system is in one option further characterized in that the second circuit is integrated in a rotary device that rotates in relation to the first circuit, and wherein said second circuit is coupled to at least one electric component of the rotary device for transmission of signals between the at least one electric component and the first circuit.

By this is achieved a transmission system wherein the transmission system can operated so as to provide means for powering and/or operating the at least one electric component such as a contact sensor applied to and rotating with the rotary device. The transmission system is also enabled to provide means for wireless transmission of data, such as measurement data, error messages and device ID from the at least electric component to the first circuit from which said data can be extracted and processed so as to control/monitor the rotary device and other devices coupled to the rotary device such as a device arranged to cause the rotary device to rotate. Furthermore, transmission of data from the first circuit can also be transmitted to the at least electric component so as to enable controlling the operations of the at least one component.

The transmission system is in one option further characterized in that the at least one electric component comprises a torque sensor for measuring the torque of the rotary device.

By this is achieved a transmission system capable of being implemented as a wireless telemetry system for providing measurements of torque of the rotary device.

One or more of these objects are also achieved by a power tool comprising a transmission system as described above.

By this is achieved a power tool that is capable of housing electrical components operating independently of cabling from an internal and/or external power supply and/or independently of cabling for signal transmission.

The power tool is in one option further characterized in that a stationary component of the power tool comprises the first circuit of the transmission system, and a rotary component of the power tool comprises the second circuit of the transmission system, so as to enable transmission of signals between the stationary component and the rotary component.

By this is achieved a power tool wherein power and/or signals can be transmitted wirelessly between the stationary component and the rotary component which is rotating relative to the stationary component during operation of the power tool. This enables the power tool to feature electrical components such as electrical components used for measurement and/or control of the rotary component or components attached thereto independent of cabling attached to said electrical components. This is advantageous for applications where the power tool have a limited space available for housing said electrical components and cabling attached thereto and/or where said electrical components are attached to rotating parts of the power tool.

One or more of these objects are also achieved by a method for wireless transmission of signals between a first circuit and a second circuit inductively coupled to each other through a non-contact interface by means of a transformer. The method comprise the step of providing, by means of a first digital transmitter of said second circuit, a first digital input signal via a first resistor to a first winding of the transformer to form one or more voltage pulses in the first winding, said one or more voltage pulses taking a positive or negative form based on if the first digital input signal has a positive or negative edge. A further method step comprise receiving, in a first comparator of said first circuit, one or more induced voltage pulses from a second winding of said transformer, induced by the one or more voltage pulses in the first winding. A further method step comprise providing a first digital output signal reflecting said first digital input signal based on said one or more induced voltage pulses.

The method is in one option further characterized in that the method is used for at least one of: transmission of digital sensor signals from a rotary device of a power tool to a stationary control unit of the power tool; transmission of digital signals from a stationary control unit of a power tool to a sensor of a rotary device of the power tool, and transmission of power from a stationary energy source of a power tool to a sensor of a rotary device of the power tool.

The dependent claims define optional characterizing features corresponding to those described in relation to the system.

DESCRIPTION OF THE DRAWINGS

The present invention will now be described in embodiments in more detail, with reference to the accompanying drawings, without limiting the interpretation of the invention thereto, where FIG. 1. shows schematically a rotating device with a transmission device according to an embodiment of the present invention FIG. 2. shows schematically a power tool with associated parts inside the tool to which the invention may be applied according to an embodiment of the present invention.

FIG. 4. shows schematically a block diagram of a transmission circuit according to an embodiment of the present invention.

FIG. 5. shows schematically waveforms outputted in a transmission circuit according to an embodiment of the present invention.

FIG. 6. shows schematically a block diagram of a transmission circuit according to an embodiment of the present invention.

FIG. 8. shows schematically a block diagram of a transmission circuit according to an embodiment of the present invention.

FIG. 9. shows schematically a block diagram of a transmission circuit according to an embodiment of the present invention.

FIG. 10. shows a flow diagram of a method for transmission of signals through a non-contact interface according to an embodiment of the present invention.

DETAILED DESCRIPTION OF EMBODIMENTS

Figure 1:
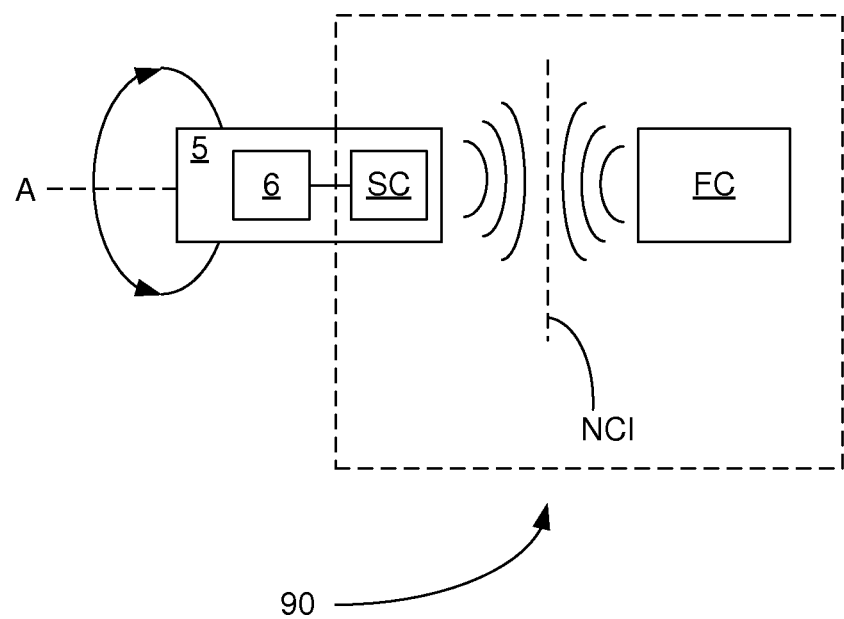

With reference to FIG. 1 a transmission system 90 for wireless transmission of signals through a non-contact interface is disclosed according to an embodiment of the present invention. The transmission system 90 comprises a first circuit FC and a second circuit SC. The second circuit SC is configured for attachment to or integration into a rotating device 5, which is arranged to rotate in relation to the first circuit FC. The rotating device 5 may be arranged to rotate in a circular path around an axis A. Said second circuit is arranged to provide transmission and/or reception of signals to and/or from the first circuit FC through a non-contact interface NCI. The transmission system 90 may be arranged to provide means for transmission of signals between a control system (not shown) coupled to the first circuit FC and at least one electric component 6 coupled to the second circuit SC. The at least one electric component 6 may be attached or integrated into the rotating device 5 or integrated into the second circuit SC. The at least one electric component 6 may be arranged to store and/or generate information. The at least one electric component may be an electro mechanic component. The at least one electric component 6 may comprise at least one sensor. The at least one electric component may comprise at least one identification component. The at least one sensor may be a contact sensor i.e. a sensor contacting the object such as the rotating device 5 on which measurements is to be performed. The at least one sensor may comprise at least one of a temperature sensor, a mechanical wear/stress sensor, a torque sensor, an angular velocity sensor, an attitude sensor. The at least one electric component 6 may comprise components such as at least one memory (not shown) and/or at least one control circuitry (not shown). The at least one control circuitry may control the operations of the at least one electric component 6. The at least one memory may be arranged to store information relating to identification and/or operation associated to the at least one electric component. The at least one memory may be arranged to store data statically and/or temporarily. The information relating to identification and/or operation associated to the at least one electric component 6 may for example relate to information generated by the at least one electric component 6, device ID, error messages associated to the at least one electric component 6 and/or control commands associated to the at least one electric component 6. In cases where the at least one electric component 6 comprises at least one sensor having at least one memory and at least one control circuitry the information stored on the at least one memory may relate to one or more of the following information measurement data, processed measurement data, sensor device ID, calibration data, error messages associated to the at least one sensor, and control commands associated to the at least one sensor.

By providing transmission of digital signals from the second circuit SC over the non-contact interface NCI to the first circuit FC, the need for signal transmission cabling between the first and second circuit is eliminated. This means that the at least one electric component 6 is enabled to perform transmission of signals to and/or from the second circuit without the need for signal transmission cabling between the second circuit and the at least one electric component 6.

The following examples relate to cases where the transmission system is used in power tools for measuring the torque at a rotating shaft of said power tools. However, it should be appreciated that various different applications are possible and that the transmission system and method described hereinafter may be used in any application where signals such as data and/or power is to be transferred wirelessly through a non-contact interface, including but not limited to a rotating non-contact interface between a rotary device and a stationary device.

Figure 2:
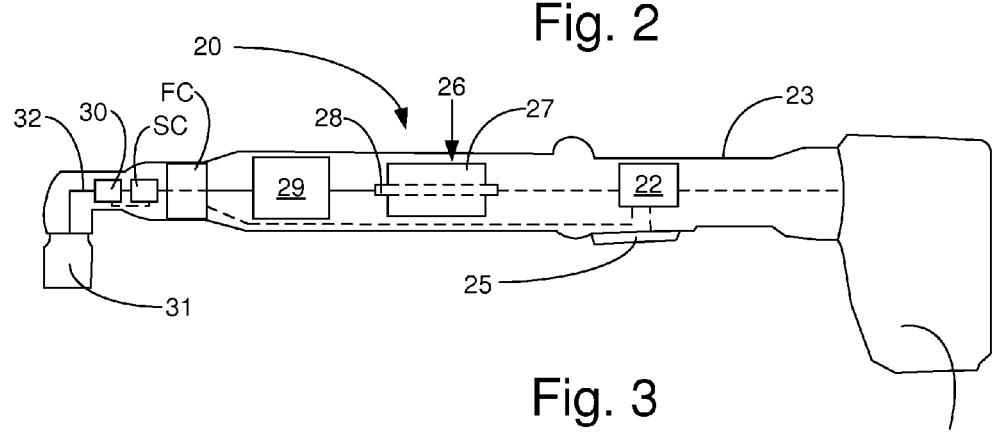

With reference to FIG. 2 a power tool of the type to which the invention may be applied is shown and described. The power tool is a portable angled nutrunner 20 used for tightening of rotatable fastening elements provided with threads, such as nuts, bolts, screws, or similar. The portable angled nutrunner 20, has a tool body 23, a drive shaft 32 and comprises an electric motor 26 including a rotor 28 and a stator 27, which rotor 28 is coupled to the drive shaft 32 for rotation of a tool piece 31 at one end of the nutrunner 20 for tightening a fastening element (not shown). The electric motor 26 may be a permanent magnet motor, such as a synchronous permanent magnet motor. In connection to the drive shaft 32 is at least one gear box 29 and at least one sensor 30, such as a torque sensor for measuring the torque during operation of the nutrunner 20. The nutrunner 20 comprises an integrated control unit 22 for controlling the operation of the nutrunner 20. The control unit 22 is coupled to an activation switch 25 arranged to activate operation of the nutrunner 20. The control unit 22 is further coupled to a power supply in the form of an integrated battery 21 and the electric motor 26 for communicating control values to the electric components of the nutrunner 20, such as control values to the electric motor 26 for controlling the operation thereof. In order to enable the tool piece 31 to rotate by means of the drive shaft 32 arranged in an angle the nutrunner 20 comprises at least an additional gear or additional gear box such as at least an additional gear or gear box comprising a bevel gear (not shown). The at least one sensor 30 is coupled to a rotating part of the nutrunner such as for example coupled to the drive shaft 32. This means that when the drive shaft 32 rotates the at least one sensor rotates with the drive shaft 32. The nutrunner 20 in addition comprises a transmission system having a first circuit FC and a second circuit SC for wireless transmission of signals over a non-contact interface such as for example one of the exemplified transmission systems with reference to FIG. 1, FIG. 4 and FIGS. 6 to 9. In more detail the at least one sensor 30 is integrated into or coupled to the second circuit SC as illustrated in FIG. 2, so as to enable transmission of signals between the at least one sensor and the first circuit FC. The second circuit SC is coupled to a rotating part of the nutrunner 20 such as for example coupled to the drive shaft 32. This means that when the drive shaft 32 rotates the at least one sensor rotates 30 with the drive shaft 32. The first circuit FC is coupled to a stationary part of the nutrunner 20 such as for example coupled to one or more of the following stationary parts or portions thereof: the tool body 23, a housing of the at least one gear box 29, and the stator 27. The drive shaft 32 may extend from the at least one gear box in a through-hole through the first circuit 10. The first circuit 10 is further coupled to the control unit 22 in order to provide transmission of signals between the control unit 22 and the first circuit 10. If the second circuit SC is coupled to the drive shaft 32 the second circuit SC may be formed to substantially surround a portion of the drive shaft by means of extending radially outwards from the drive shaft 32. The non-contact interface may be formed in a gap between at least parts of a side portion of the first circuit FC and at least part of a side portion of the second circuit SC, wherein said side portions facing each other.

Figure 3:
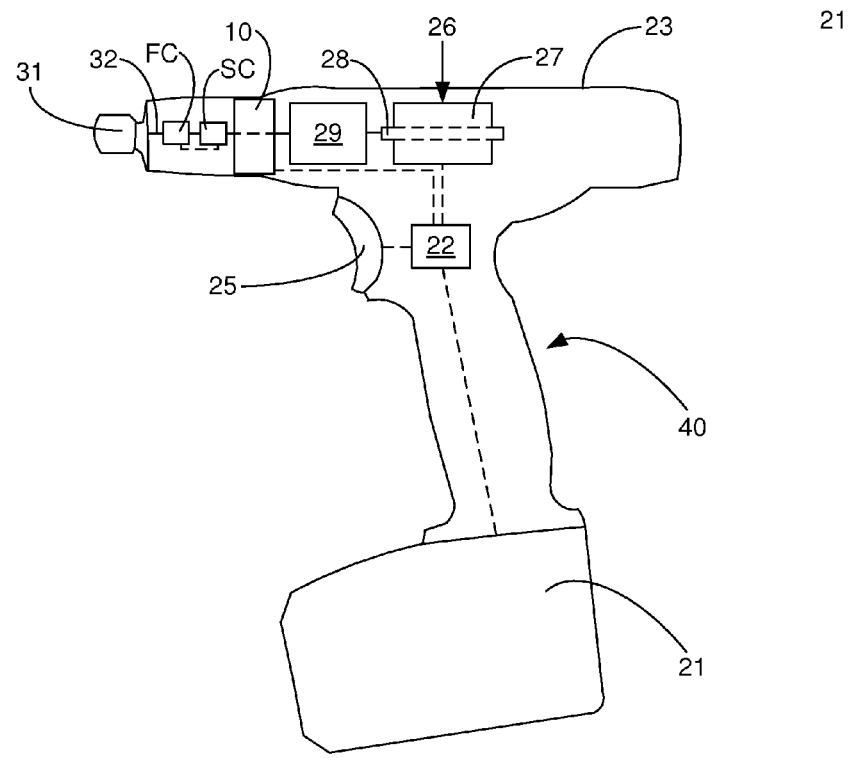
FIG. 3. shows schematically a power tool with associated parts inside the tool to which the invention may be applied according to an embodiment of the present invention.

With reference to FIG. 3 a further power tool of the type to which the invention may be applied is shown and described. The power tool of FIG. 3 is a portable nutrunner 40 having most components and features in common with the nutrunner 20 described with reference to FIG. 2. Hence, the same reference numerals have been used for the components and features in common, and in the following such description has been omitted. The main difference between the nutrunner 40 described with reference to FIG. 3 and the nutrunner 20 described with reference to FIG. 2 is that the tool body 23 and the drive shaft 32 are configured differently.

It is to be noted that the power tool 20, 40 can be configured differently as compared to the power tool with reference to FIG. 2 and FIG. 3. The power tool 20, 40 can for example be a pneumatic power tool. The power tool may be stationary. The power tool 20, 40 can be a screwdriver, power wrench, or similar. The power tool 20, 40 may comprise additional components such as an integrated and/or external display unit arranged to display parameters relevant for the operation of the power tool 20, 40. The power tool 20, 40 may instead of using the integrated battery be arranged to use an external power source as power supply. The control unit of the power tool 20, 40 may be arranged externally of said power tool such as in a control station coupled to said power tool 20, 40. The at least one sensor 30 may comprise additional components such as at least one memory (not shown) and/or at least one control circuitry (not shown). The at least one control circuitry may control the operations of the at least one sensor and the at least one memory may be arranged to store information relating to identification and/or operation associated to the at least one sensor. The information relating to identification and/or operation associated to the at least one sensor 30 may for example relate to measurement data, processed measurement data, sensor device ID, calibration data, error messages and/or control commands. The power tool 20, 40 may comprise additional components and/or features known within the art of power tools. The at least one sensor 30, the first communication device 9 and the second communication device 10 can be mounted differently as compared to the illustrated exemplifications with reference to FIGS. 2 and 3. The at least one sensor 30, the first circuit FC and the second circuit SC are preferably mounted in a front portion near the tool piece 31 of the nutrunner 20, 40. The front portion may depending on the type of nutrunner comprise a front portion defined along a portion of the drive shaft 32 extending between the tool piece 31 and the bevel gear or the at least one gear box 29. The at least one sensor 30, the first circuit FC and the second circuit SC can also be mounted along portion of the nutrunner 20, 40 extending between the rotor 28 of the electric motor 26 and the at least one gear box 29. Furthermore, the first circuit FC may be formed in part or entirely by the control unit 22 of the respective nutrunners 20, 40 illustrated with reference to FIGS. 2 and 3. The at least one sensor 30 and the second circuit SC can also be mounted on or be integrated into the tool piece 31 on a side portion of the tool piece facing the tool body 23. If the at least one sensor 30 and the second circuit SC is mounted on or integrated into the tool piece 31 the first circuit may be mounted on or integrated into a portion of the tool body facing the tool piece 31. The at least one sensor 30 and the second circuit SC can also be mounted on or be integrated into an end portion of the drive shaft 32. The end portion of said drive shaft 32 may for example be an end portion facing at least one of the at least one gear box 29, the at least an additional gear or gear box comprising the bevel gear.

With reference to FIG. 4 a transmission circuit of the transmission system 100 according to an embodiment of the present invention is illustrated. FIG. 5 shows waveforms over time T, inputted to and produced by the transmission circuit of the transmission system 100 in FIG. 4.

The transmission circuit of the transmission system 100 comprises a first circuit FC and a second circuit SC. The second circuit SC is arranged to form positive and negative voltage pulses in a transformer T1, said voltage pulses corresponding to rising edges and falling edges of a digital input signal provided to the second circuit SC. The first circuit FC is arranged to use the positive and negative voltage pulses formed in the transformer T1 to form a digital output signal, said digital output signal corresponding to a re-created version of the digital input signal. This means that the second circuit SC is able to transmit digital signals to the first circuit FC over a non-contact interface NCI wirelessly using the inductive coupling provided by the transformer T1.

In more detail the first circuit FC of the transmission system 100 is coupled to a primary winding P1 of a transformer T1 and the second circuit SC of the transmission system 100 is coupled to a secondary winding P2 of said transformer T1. The transformer T1 is configured to provide means for transmission of signals between the first circuit and the second circuit through the non-contact interface NCI. In addition, the first circuit is coupled to a first input/output interface IO1 and the second circuit is coupled to a second input/output interface IO2. When inputting a digital input signal such as a digital signal corresponding to a first waveform W1 via the first input/output interface IO1 to the first circuit FC, said first circuit FC is arranged to supply the digital input signal via a series resistor (not shown) to the primary winding P1 of the transformer T1. By supplying the digital input signal to the primary winding P1 via the series resistor, one or more voltage pulses are formed in the primary winding P1. The one or more voltage pulses formed in the primary winding P1 may for example correspond to the one or more voltage pulses described with reference to FIG. 5 by a waveform W2. A rising edge of said digital input signal applied to the primary winding P1 of said transformer T1 provides a positive voltage pulse in said primary winding P1. A falling edge of said digital input signal applied to the primary winding P1 of said transformer T1 provides a negative voltage pulse in said primary winding P1.

The one or more voltage pulses in the primary winding P1 introduced by applying the digital input signal to the primary winding P1 provide one or more voltage pulses in the secondary winding P2 of the transformer due to magnetic induction coupling. Said one or more voltage pulses in the secondary winding P2 being similar to the one or more voltage pulses in the primary winding P1. The one or more voltage pulses formed in the secondary winding P1 by means of induction may for example correspond to the one or more voltage pulse as shown by a waveform W3 in FIG. 5. The one or more voltage pulses induced in the second winding P2 may differ slightly as compared to the one or more voltage pulses in the primary winding P1 with respect to amplitude, DC level and possible addition of noise. The amplitude of the one or more voltage pulses induced in the secondary winding P2 is partly dependent on turns ratio of the transformer T1 and coupling between the primary and secondary windings. The second circuit SC is arranged to translate the voltage pulses in the secondary winding P2 into a digital output signal, such as a digital output signal having a waveform W4 as shown in FIG. 5, to be outputted from the second circuit via for example the second input/output interface IO2. The second circuit SC is arranged to create the digital output signal by setting the digital output signal in a first direction when the one or more voltage pulse induced in the secondary winding P2 is positive and by setting the digital output signal in a second direction different than said first direction when the one or more voltage pulse induced in the secondary winding P2 is negative. The second circuit SC is further arranged to create the digital output signal by holding the digital output signal stable in a direction corresponding to the last set direction until a voltage pulse in an opposite direction compared to the previous voltage pulse is induced in the secondary winding P2. This means that the digital output signal created by the above described second circuit SC substantially correspond to the digital input signal inputted by the first circuit. Accordingly, the first and second circuit are capable of performing transmissions of digital signals over the non-contact interface NCI i.e. the first and second circuit are capable of performing wireless transmissions of digital signals.

It is to be noted that the transmission system and associated first and second circuit may be configured differently as compared to what is described above with reference to FIG. 4. The transmission direction may be reversed i.e. the second circuit SC may be arranged to transfer digital signals to the first circuit FC in a similar fashion as described above. The transmission direction may further be alternated so as to provide means for bi-directional transmission of digital signals such as for example half-duplex transmissions. The one or more voltage pulses induced in the secondary winding P2 of the transformer T1 may be inverted if appropriate by modifying the directions of the windings of the transformer T1. By modifying the directions of the windings of the transformer the digital output signal, i.e. digital signal outputted by the secondary circuit SC, may be inverted as compared to the digital input signal. The transformer T1 may be a rotary transformer. This is suitable in cases where the second circuit SC is integrated in a rotary device that rotates in relation to the first circuit FC, e.g. if the second circuit SC together with the secondary winding P2 is applied to or integrated into the rotating device 5 of the exemplary transmission system illustrated in FIG. 1 or if the second circuit together with the secondary winding P2 of the transformer T1 is integrated in or applied to a rotating part such as the drive shaft 32 of the exemplary power tools 20 and 40 illustrated in FIGS. 2 and 3. This is advantageous since it eliminates the need of transmission cabling attached to the rotary device and since it provides wireless transmission using a minimal number of circuit components, and so minimizes the size, power consumption and complexity thereof.

With reference to FIG. 6 a transmission circuit of a transmission system 110 according to an embodiment of the present invention is illustrated.

The transmission system 110 of FIG. 6 have a number of components and features in common with the transmission system 100 described with reference to FIG. 4. Hence, the same reference numerals have been used for the components and features in common, and in the following such description has been omitted.

In this embodiment the first circuit FC of the transmission system 110 comprises a first receiver circuit RE1, surrounded by a dashed line in FIG. 6. The second circuit SC of the transmission system 110 comprises a first transmitter circuit TRS2, surrounded by another dashed line in FIG. 6.

This means that the transmission system 110 is arranged to perform transmission of digital signals from the second circuit SC to the first circuit FC.

The first transmitter circuit TRS2 comprises a first digital transmitter TRAN2 coupled from an output terminal of the first digital transmitter via a first series resistor R2 to a first pole of the secondary winding P2 of the transformer T1. The first digital transmitter TRAN2 preferably comprises a first logic buffer i.e. a component formed of an even number of series coupled inverters. Alternatively the first digital transmitter TRAN2 may comprise an output of a microcontroller coupled to the first transmitter circuit TRS2. A second pole of the secondary winding P2 may, depending on application, be coupled to a supply voltage provided by the second circuit or to ground GND2, provided by the second circuit as shown in FIG. 6. An input terminal of said first digital transmitter TRAN2 is configured to receive a first digital input signal TX2, such as a digital input signal provided by a buffer or input/output interface coupled to the input terminal of the first digital transmitter TRS2. The first digital input signal TX2 may be a digital signal having the waveform W1 as shown in FIG. 5. The first digital transmitter TRAN2 is arranged to provide the first digital input signal TX2 via the first series resistor R2 to the secondary winding P2 of the transformer T1. The first digital transmitter TRAN2 is arranged to provide the first digital input signal TX2 via the first series resistor R2 so as to form one or more voltage pulses in the secondary winding of the transformer T1. In more detail the waveform outputted by the first digital transmitter TRS2 is substantially corresponding to the waveform W1 of the first digital input signal TX2. The waveform outputted by the first digital transmitter TRS2 may be amplified with respect to amplitude as compared to the waveform W1 of the first digital input signal TX2 depending on the configuration of the first digital transmitter TRS2. The one or more voltage pulses are shaped in the secondary winding P2 of the transformer T1 when digital data is applied via the series resistor R2.

In response to receiving a low to high transition of the digital input signal TX2, i.e. a rising edge, the first digital transmitter TRAN2 is arranged to provide the first digital input signal TX2 via the first series resistor R2 to the secondary winding P2 of the transformer T1 so as to form a positive pulse in the secondary winding P2.

In response to receiving a high to low transition of the digital input signal TX2, i.e. a falling edge, the first digital transmitter TRS2 is arranged to provide the first digital input signal TX2 via the first series resistor R2 to the secondary winding P2 of the transformer T1 so as to form a negative pulse in the secondary winding P2. This means that positive and negative voltage pulses with respect to the ground or the supply voltage are provided in the secondary winding P2 of the transformer, corresponding to the edges of the first digital input signal TX2. The one or more voltage pulses formed in the secondary winding P2 may for example correspond to the one or more voltage pulses described with reference to FIG. 5 by the waveform W2. These positive and negative voltage pulses are induced into the primary winding P1 of the transformer T1 as described above. The one or more voltage pulses formed in the primary winding P1 may for example correspond to the one or more voltage pulses described with reference to FIG. 5 by the waveform W3. In more detail the one or more pulses are shaped by means of that the waveform after the first series resistor R2, i.e. over the secondary winding P2 is transformed to positive and negative pulses due to the inductance. When a rising edge appears at the output of the first digital transmitter TRS2, the voltage over the secondary winding P2 of the transformer T1 immediately rise as the initial current is zero in an inductor formed by the secondary winding P2 and then decrease as the current increases in the inductor. After a short period of time the current will be limited by first the series resistor R2 and the voltage over the secondary winding P2 will be close to zero. The voltage drop will be over the first series resistor R2 instead. A falling edge will similarly cause a negative voltage pulse over the secondary winding P2.

Apart from being involved in shaping the one or more voltage pulses together with the inductance of the secondary winding P2 the first series resistor R2 also provides the first transmitter TRS2 with protection from short-circuits.

The first receiver circuit RE1 comprises a first comparator COMP1 coupled to a first pole (not shown) of the primary winding P1 of the transformer via a non-inverting input of the first comparator COMP1. A second pole of the primary winding may, depending on application, be coupled to ground provided by the first circuit or to a supply voltage VCC1 provided by the first circuit or as shown in FIG. 6. The inverting input of the first comparator is coupled to a first reference voltage REF1. The first reference voltage REF1 is selected such that each time either a negative or positive pulse appearing on the primary winding P1 of the transformer T1 the reference voltage is crossed.

The first comparator COMP1 is arranged to provide a first digital output signal RX1 that reflects the first digital input signals TX2. The first comparator COMP1 is arranged to provide the first digital output signal RX1 based on exploiting the positive and negative form of the one or more voltage pulses induced into the primary winding P1 of the transformer T1. The first comparator COMP1 is arranged to form the first digital output signal RX2 based on outputting either a logical "1" or a logical "0" any time when a positive or negative voltage pulse is applied to its non-inverting input. The first comparator COMP1 is further arranged to form the first digital output signal RX2 based on switching its current output state from either a logical "1" or a logical "0" into a logical "0" or a logical "1" when a voltage pulse of opposite direction than the previous voltage pulse is applied to its non-inverting input. The first comparator COMP1 is further arranged to form the first digital output signal RX2 based on holding its current output state i.e. either a logical "1" or a logical "0" until a voltage pulse of opposite direction than the previous voltage pulse is applied to its non-inverting input. This means that when the one or more voltage pulses formed in the primary winding P1 are applied to the non-inverting input of the first comparator COMP1 said first comparator COMP1 is able to form the first digital output signal RX1 reflecting the first digital input signal TX2.

The first comparator COMP1 comprises an integrated hysteresis so as to provide immunity to noise. The integrated hysteresis of the first comparator COMP1, the transformer and associated supply voltage is configured such that the amplitude of the negative and positive pulses in the primary winding P1 are larger than the amplitude of the integrated hysteresis voltage in order to ensure appropriate transition of the output signal, i.e. the digital output signal RX1 outputted by the first comparator COMP1. A comparator without integrated hysteresis normally changes its output state when the voltage between its non-inverting input and its inverting input crosses through approximately fixed voltage such as zero voltage. By introducing the integrated hysteresis the comparator COMP1 apart from being de-sensitized from noise the first comparator COMP1 is also provided with two separate voltage levels across which the output state of the comparator is changed or switched. In more detail the added hysteresis provides two separate voltage levels which when crossed results in a change of output state of the first comparator COMP1. A first voltage level of the two separate voltage levels is assigned for rising voltages and a second voltage level of the two separate voltage levels is assigned for falling voltages. This means that the first comparator COMP1 by an appropriate choice of hysteresis voltage can be configured to change its output both when a positive pulse appears on the primary winding P1 of the transformer T1 and when a negative pulse appears on the primary winding of the transformer. This means that the first receiving circuit RE1 can be realized using a single active component in the form of the single first comparator COMP1.

By providing transmission of digital signals from the second circuit SC over the non-contact interface NCI to the first circuit FC, the need for signal transmission cabling between the first and second circuit is eliminated. This is particularly advantageous in cases where the second circuit SC is integrated in a rotary device that rotates in relation to the first circuit FC, e.g. if the second circuit SC together with the secondary winding P2 is applied to or integrated into the rotating device 5 of the exemplary transmission system illustrated in FIG. 1 or if the second circuit together with the secondary winding P2 of the transformer T1 is integrated in or applied to a rotating part such as the drive shaft 32 of the exemplary power tools 20 and 40 illustrated in FIGS. 2 and 3, since it eliminates the need of transmission cabling attached to the rotary device and since it provides wireless transmission using a minimal number of circuit components, and so minimizes the size, power consumption and complexity thereof. The non-contact interface could also be used if galvanic isolation is required, for example for safety reasons if one side i.e. first or second circuit contains high voltages.

It is to be noted that the transmission system 110 and associated first and second circuit may be configured differently as compared to what is described above with reference to FIG. 6. The first circuit FC may for example instead of comprising the first receiver circuit be configured to comprise the first transmitter circuit and the second circuit SC may instead of comprising the first transmitter circuit TRS2 be configured to comprise the first receiver circuit RE1. This results in that the transmission direction is reversed such that the first circuit FC is enabled to perform transmission of digital signals to the second circuit SC. The first and/or second circuit may further each comprise an universal asynchronous receiver/transmitter (UART) for handling digital input and/or output signals to be received/transmitted.

Figure 7:
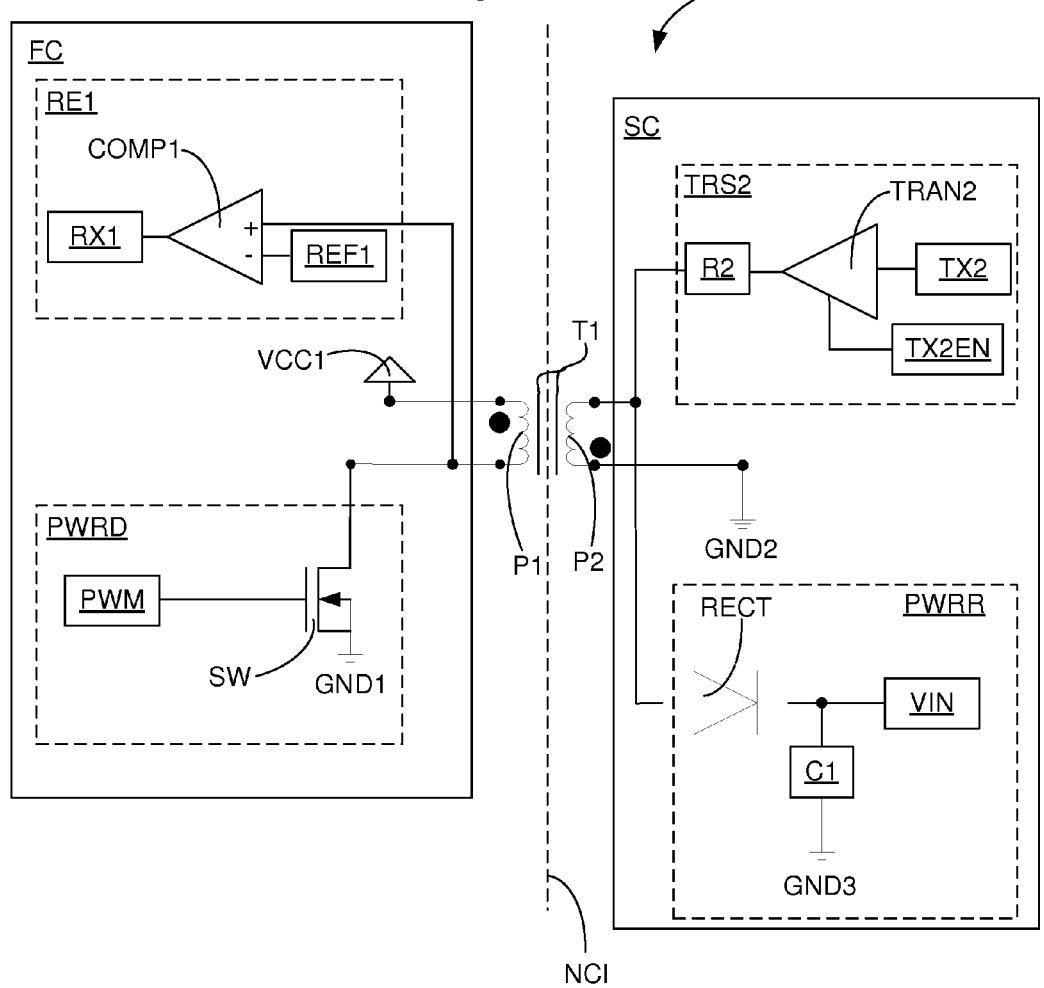
FIG. 7. shows schematically a block diagram of a transmission circuit according to an embodiment of the present invention.

With reference to FIG. 7 a transmission circuit of a transmission system 120 according to an embodiment of the present invention is provided.

The transmission system 120 of FIG. 7 have a number of components and features in common with the transmission system 110 described with reference to FIG. 6. Hence, the same reference numerals have been used for the components and features in common, and in the following such description has been omitted.

The transmission system 120 differs from the transmission system 110 described with reference to FIG. 6 in that the transmission system 120 comprises circuits for transmission of power over the non-contact interface NCI. The circuits for power transmission are based on a flyback converter topology.

The first circuit FC of the transmission system 120 comprises a power driver circuit PWRD, surrounded by a dashed line in FIG. 7. The power driver circuit PWRD is arranged to transmit power to the second circuit SC over the non-contact interface NCI. The second circuit SC of the transmission system comprises a power receiver circuit PWRR, surrounded by a dashed line in FIG. 7. The power receiver circuit PWRR arranged to store the power received from the power driver circuit of the first circuit for subsequent use as supply voltage VIN for the second circuit SC and/or as supply voltage for other circuits/components coupled to the second circuit SC.

In more detail the power driver circuit PWRD comprises a switch SW coupling the first pole of the primary winding P1 of the transformer T1 to ground GND1. The switch may be a MOSFET (metal-oxide-semiconductor field-effect transistor) switch such as for example an open-drain MOSFET switch. When activated, the switch SW is arranged to cause a linearly increasing current in the primary winding P1 of the transformer T1. When the switch SW is de-activated, a current will continue to run in the secondary winding P2 of the transformer T1, due to the inductive properties of the transformer T1.

The power receiver circuit PWRR comprises a rectifier RECT arranged to store the power induced in the secondary winding P2 of the transformer T1 in a power storage element. The rectifier RECT is configured to be high impedive so as to avoid adversely influencing the other components of the second circuit SC including the signals to be communicated over the transformer during transmission from the first transmitter circuit TRS2. The rectifier is coupled to the first pole of the secondary winding P2 of the transformer T1. The power storage element may be a capacitor C1 coupled to the rectifier RECT and ground GND3. The power receiver circuit may further comprise a voltage regulator (not shown) so as to provide a stable output in the form of a stable supply voltage VIN associated to the second circuit SC. The voltage regulator may be a linear voltage regulator such as a low-dropout (LDO) regulator.

The switch SW may be directly controlled using a control signal provided to the switch SW by a signal source (not shown). The signal source may for example be provided by first control unit (not shown) coupled to the first circuit FC. The first control unit may be a microcontroller having a signal source with an output coupled to the switch, such as a PWM (pulse-width-modulating) signal source providing a square waveform as input signal to the switch. The microcontroller may for example form part of the control unit 22 of the power tool embodiments illustrated in FIGS. 2 and 3. In case the signal source is a PWM source the pulse width of the signal provided to the switch SW may be kept constant. Optionally, in case the signal source is a PWM source, the pulse width of the signal provided to the switch SW may be kept constant as long as the voltage induced in the second winding P2 of the transformer T1 is within a predetermined tolerance window, and varied if said voltage is too high or low, i.e. outside the tolerance window. Detection of voltages that are outside said tolerance window may be performed by a second control unit (not shown) coupled to the second circuit SC such as a microcontroller coupled to the second circuit SC. Upon detection of voltages outside said tolerance window, the second control unit coupled to the second circuit SC may be arranged to communicate a digital signal using the first transmitter circuit TRS2 via the first receiver circuit RE1 to the first control unit of the first circuit. Upon receiving information about the voltage level induced in the secondary winding P2 is outside the tolerance window, the first control unit controlling the switch SW may modify the pulse width of the signal provided to the switch SW accordingly.

In this embodiment the first series resistor R2 also provides protection of the output of the first digital transmitter TRS2 from high voltages occurring during power transmission.

By providing transmission of power from the first circuit FC over the non-contact interface NCI to the second circuit SC, the need for a separate power source for powering the second circuit is eliminated. This is particularly advantageous in cases where the second circuit SC is integrated in a rotary device that rotates in relation to the first circuit FC, e.g. if the second circuit SC together with the secondary winding P2 is applied to or integrated into the rotating device 5 of the exemplary transmission system 90 illustrated in FIG. 1 or if the second circuit together with the secondary winding P2 of the transformer T1 is integrated in or applied to a rotating component such as the drive shaft 32 of the exemplary power tools 20 and 40 illustrated in FIGS. 2 and 3, since it eliminates the need of an internal power source in the rotary device, and so minimizes the size and complexity thereof.

It is to be noted that the transmission system 120 may be configured differently than the illustrated transmission system 120 with reference to FIG. 7. The switch SW can be implemented as a high side switch with the second pole of the transformer T1 connected to ground instead of the supply voltage VCC1. The rectifier RECT may rectify voltages differently depending on the application. The polarity may be chosen so that the switch SW of the power driver circuit PWRD is configured as a low side driver since NMOS transistors generally has better performance than PMOS transistors. The input terminal of the first comparator COMP1 and the first digital transmitter TRS2 may be coupled differently to comply with the modifications above.

With further reference to FIG. 7, the transmission system 120 is arranged to alternate between providing power from the first circuit FC to the second circuit SC and providing transmission of digital signals from the second circuit SC to the first circuit FC. In order to alternate between transmission of digital signals and transmission of power, the transmission system 120 is arranged to implement a time-slot scheme. In this embodiment the time-slot scheme may be implemented by setting the first circuit FC as master controller and the second circuit SC as slave. The time slot scheme may be operated using a first control unit coupled to the first circuit and a second control unit coupled to the second circuit. The first and second control unit may each be implemented by components such as at least a processor and at least one memory or a microprocessor. The first control unit may for example form part of the control unit 22 of the power tool embodiments illustrated in FIGS. 2 and 3. By dividing time into a number of consecutive time-slots, the control units of the first and second circuit respectively are enabled to alternate between transmission of power and digital signals in a controlled fashion. Each time-slot of the number of consecutive time-slots may have at least a first portion dedicated for power transmission and at least a second portion dedicated for transmission of digital signals. Each time-slot of said number of consecutive time-slots may have a fixed duration in time in an interval from 1 microsecond to 1000 microseconds such as for example 125 microseconds. In order for the transmission system 120 to detect when to alternate between power transmission and digital signal transmission the transmission system 120 may be arranged to alternate, i.e. trigger switching from power transmission to digital signal transmission or vice versa, based on one or more characteristics of power pulses appearing during power transmission. The switching from transmitting power to transmitting digital signals may for example be triggered during each time-slot of the number of consecutive time-slot by means of the second control unit detecting a first predetermined number of increases of current or voltage pulses in the secondary winding P2 of the transformer T1 caused by providing the above mentioned control signal to the switch SW. Furthermore, the first control unit is arranged to adapt the control signal provided to the switch SW during each time-slot of said number of consecutive time-slots such that power transmission is halted after the first predetermined number of increases in current have been provided in the secondary winding P1 of the transformer T1. This means that during the at least one first portion of each time-slot of the number of consecutive time-slot the first control unit causes the power driver circuit PWRD to transmit power. During the at least one second portion of each time-slot of the number of consecutive time-slots the first control unit cause the power driver circuit PWRD to halt transmission of power. In response to detecting said predetermined number of increases of current the second control unit is arranged to cause the first transmitter circuit TRS2 to initiate transmission of the digital signal TX2 for the remaining portion of the current time-slot i.e. during the at least second portion of each time-slot of the consecutive number of time-slots.

The first digital transmitter TRS2 may comprise tri-state logic to enable the first digital transmitter TRS2 to assume a high impedance state, as described in more detail with reference to FIG. 8. As default the first digital transmitter is set in high impedance state. When the first digital transmitter TRS2 is arranged to perform transmission of digital signals the first control unit may set a transmit enable input TX2EN of the first digital transmitter TRS2 to active whereby the high impedance state is disabled to allow for transmission of digital signals. After the first digital transmitter has completed transmission of digital signals the second control unit may set the digital transmitter in the high impedance state. The operations with regard to controlling the transmit enable input TX2EN of the first transmitter TRS2 may be guided by using the above described time-slot scheme. Implementing the tri-state logic in the first digital transmitter TRS2 is advantageous since the first digital transmitter can be set in high impedance state during transmission of power such that the first digital transmitter avoid consuming un-necessary power during power transmission i.e. when no digital signals are transmitted.

With reference to FIG. 8 a transmission circuit of a transmission system 130 according to an embodiment of the present invention is illustrated.

The transmission system 130 of FIG. 8 have a number of components and features in common with the transmission system 110 described with reference to FIG. 6. Hence, the same reference numerals have been used for the components and features in common, and in the following such description has been omitted.

The transmission system 130 differs from the transmission system 110 described with reference to FIG. 6 in that the transmission system 130 comprises circuits for bi-directional half-duplex transmission of digital signals between the first circuit FC and the second circuit SC.

In addition to a first receiver RE1 the first circuit of the transmission system 130 comprises a second transmitter circuit TRS1, surrounded by a dashed line in FIG. 8. The second transmitter circuit TRS1 comprises a second digital transmitter TRAN1 coupled from an output terminal of the second digital transmitter TRAN1 via a second series resistor R1 to a first pole of the primary winding P1 of the transformer T1. The second digital transmitter TRAN1 preferably comprises a second logic buffer i.e. a component formed of an even number of series coupled inverters. Alternatively the second digital transmitter TRAN1 may comprise an output of a microcontroller coupled to the second transmitter circuit TRS1, such as for example a microcontroller formed by at least parts of the control unit 22 of the exemplary power tool embodiments illustrated in FIGS. 2 and 3. An input terminal of said second digital transmitter TRAN1 is configured to receive a second digital input signal TX1 such as a digital input signal provided by a buffer or an input/output interface coupled to the input terminal of the second digital transmitter TRAN1. The operations of the second transmitter circuit TRS1 associated with the first circuit FC are performed in a similar fashion to the operations performed by the first transmitter circuit TRS2 associated with the second circuit SC, as described above with reference to for example FIG. 6. This means that in response to receiving a low to high transition of the second digital input signal TX1, i.e. a rising edge, the second digital transmitter TRAN1 is arranged to provide the second digital input signal TX1 via the second series resistor R1 to the primary winding P1 of the transformer T1 so as to form a positive pulse in the primary winding P1. In response to receiving a high to low transition of the second digital input signal TX1, i.e. a falling edge, the second digital transmitter TRS1 is arranged to provide the second digital input signal TX1 via the second series resistor R1 to the primary winding P1 of the transformer T1 so as to form a negative pulse in the primary winding P1. This means that positive and negative voltage pulses with respect to the ground or the supply voltage are provided in the primary winding P1 of the transformer, corresponding to the edges of the second digital input signal TX1.

Apart from being involved in shaping the one or more voltage pulses together with the inductance of the windings the second series resistor R1 also provides the second transmitter TRS1 with protection from excessive currents.

In addition to a first transmitter circuit TRS2 the second circuit of the transmission system 130 comprises a second receiver circuit RE2, surrounded by a dashed line in FIG. 8.

The second receiver circuit RE2 comprises a second comparator COMP2 coupled to a first pole (not shown) of the secondary winding P2 of the transformer T1 via a non-inverting input of the second comparator COMP2. A second pole of the primary winding may, depending on application, be coupled to ground provided by the first circuit or to a supply voltage provided by the second circuit SC. The inverting input of the second comparator is coupled to a second reference voltage REF2. The second reference voltage REF2 is selected such that each time either a negative or positive pulse appearing on the secondary winding P2 of the transformer T1 the reference voltage is crossed.

The second comparator COMP2 is arranged to provide a second digital output signal RX2 that reflects the second digital input signals TX1. The second comparator COMP2 is arranged to provide the second digital output signal RX2 based on exploiting the positive and negative form of the one or more voltage pulses induced into the secondary winding P2 of the transformer T1. The second comparator COMP2 is arranged to operate in a similar fashion as the first comparator COMP1 described with reference to FIG. 6. This means that when the one or more voltage pulses formed in the secondary winding P1 are applied to the non-inverting input of the second comparator COMP2 said second comparator COMP1 is able to form the digital output signal RX2 reflecting the digital input signal TX1.

The second comparator COMP2 comprise an integrated hysteresis so as to provide immunity to noise and so as to provide two separate voltage levels which when crossed results in a change of output state of the second comparator COMP2. This causes the second comparator to operate in a similar fashion as the first comparator COMP1 with added hysteresis as described with reference to FIG. 6. This means that the second receiving circuit RE2 can be realized using a single active component in the form of the single second comparator COMP2.

The operations of the second receiver circuit RE2 associated with the second circuit SC are performed in a similar fashion to the operations performed by the first receiver circuit RE1 associated with the first circuit FC, as described above with reference to for example FIG. 6.

The addition of the second transmitter circuit TRS1 associated with the first circuit FC and the second receiver circuit RE2 associated with the second circuit SC enables the transmission system 130 to perform bi-directional half-duplex bi-directional transmission of digital signals between the first circuit FC and the second circuit SC.

In this embodiment the first digital transmitter TRAN2 of the second circuit SC comprises tri-state logic. The second digital transmitter TRAN1 of the first circuit FC also comprises tri-state logic. This means that apart from providing a logical "1" or "0" the output of the first and second transmitter can also be set to assume a high impedance state. The first and/or second digital transmitter TRS2, TRS1 is set in high impedance state when not performing transmission of signals. The first and second digital transmitter each comprises a transmit enable input TX2EN, TX1EN that when activated is arranged to disable the high impedance state. This means that upon providing a transmit enable signal to the transmit enable input the high impedance state of the associated digital transmitter is disabled. When the digital transmitter is set in the high impedance state, no output is provided from the digital transmitter. Setting one of the first or second digital transmitters in high impedance state prevents the digital transmitter set in high impedance state from adversely influencing the operations of the other digital transmitter including signals transmitted from the other digital transmitter.

The tri-state enable input of the second transistor TRAN1 of the first circuit FC may be operated by a controller such as the first control unit described with reference to FIG. 7. The first control unit may for example form part of the control unit 22 of the power tool embodiments illustrated in FIGS. 2 and 3. The tri-state enable input of the first digital transmitter TRAN2 of the second circuit SC may be operated by a controller such as the second control unit described with reference to FIG. 7.

With further reference to FIG. 8, the transmission system 130 is arranged to alternate between transmission of digital signals from the first circuit FC to the second circuit SC and transmission of digital signals from the second circuit SC to the first circuit FC. The first and second control unit coupled to the first and second circuit may be arranged to control operations relating to alternating between transmission of digital signals from the first circuit FC to the second circuit SC and transmission of digital signals from the second circuit SC to the first circuit FC.

The operations of the first and second control unit with respect to controlling the transmit enable input of the respective digital transmitters and alternating between transmission of digital signals from the first circuit to the second circuit and transmission of digital signals from the second circuit to the first circuit may be guided using a time-slot scheme. In this embodiment the time-slot scheme may include trigger signals being transmitted between the first and second circuit using the respective receiver and transmitter circuits. The trigger signals are arranged to indicate points in time or when in a sequence the respective transmitter circuits are allowed to transmit digital signals. Different types of trigger signals may also be implemented so as to indicate a type of digital signals to be transmitted. The different types of trigger signals may for example indicate that control commands or measurement data are to be transmitted.

As an example the first transmitter circuit TRAN2 may transmit a digital signal TX2 to the first receiver circuit RE1 of the first circuit FC during which the transmit enable input TX2EN of the first digital transmitter TRS2 is active and the transmit enable input TX1EN of the second digital transmitter TRS1 of the first circuit FC is de-activated. After completing transmission of the first digital signal TX2 the first digital transmitter transmit a first trigger signal to the first receiver circuit RE1 of the first circuit FC. After completing transmission of the first trigger signal the second control unit set the transmit enable input TX2EN of the first transmitter TRS2 to de-activated.

Upon receiving the first trigger signal the first control unit set the transmit enable input TX1EN of the second digital transmitter TRAN1 of the second transmitter circuit TRS1 to active where after the second digital transmitter TRS1 of the second transmitter circuit TRAN1 may transmit a second digital signal TX1 followed by a second trigger signal to the second receiver circuit RE2 of the second circuit SC. After completing transmission of the second trigger signal the first control unit set the transmit enable input TX1EN of the second digital transmitter TRAN1 to de-activated. Upon receiving the second trigger signal the second control unit set the transmit enable input TX2EN of the first digital transmitter TRAN2 of the first transmitter circuit TRAN2 to active where after the first transmitter circuit TRAN1 may transmit a first digital signal TX2 followed by the first trigger signal to the second receiver circuit RE2 of the second circuit SC. This process may be repeated so as to form a number of consecutive time-slots, each in which one of the first or second transmitter circuit are allowed to transmit digital signals. The number of consecutive time-slots may be configured to have the duration as described with reference to FIG. 7.

By providing alternating bi-directional transmission of digital signals from the second circuit SC over the non-contact interface NCI to the first circuit FC and from the first circuit FC over the non-contact interface NCI to the second circuit SC, the need for signal transmission cabling between the first and second circuit is eliminated. Furthermore, there is no need for a plurality of transformers with associated circuits is for accomplishing half-duplex bi-directional transmission of digital signals. This is particularly advantageous in cases where the second circuit SC is integrated in a rotary device that rotates in relation to the first circuit FC, e.g. if the second circuit SC together with the secondary winding P2 is applied to or integrated into the rotating device 5 of the exemplary transmission system 90 illustrated in FIG. 1 or if the second circuit SC together with the secondary winding P2 of the transformer T1 is integrated in or applied to a rotating component such as the drive shaft 32 of the exemplary power tools 20 and 40 illustrated in FIGS. 2 and 3, since it eliminates the need of transmission cabling attached to the rotary device and since it provides wireless a high data rate transmission using a minimal number of circuit components, and so minimizes the size, power consumption and complexity thereof.

With reference to FIG. 9 a transmission circuit of a transmission system 140 according to an embodiment of the present invention is provided.

The transmission system 140 of FIG. 9 has a number of components and features in common with the transmission system 110, 120 and 130 described with reference to FIG. 6, FIG. 7 and FIG. 8. Hence, the same reference numerals have been used for the components and features in common, and in the following such description has been omitted.

The transmission system 140 differs from the transmission system 110, 120 and 130 described with reference to FIG. 6, FIG. 7 and FIG. 8 in that the transmission system 140 comprises both circuits for bi-directional communication of digital signals as described with reference to FIG. 8 and circuits for transmission of power as described with reference to FIG. 7.

To enable bi-directional transmission of digital signals, such as half-duplex transmission of digital signals alternated with power transmission, the first digital transmitter TRAN2 of the second circuit SC and the second digital transmitter TRAN1 of the first circuit FC preferably each comprises a tri-state logic. The first and/or second digital transmitter TRS2, TRS1 is set in high impedance state when not performing transmission of signals. The first and second digital transmitter each comprises a transmit enable input TX2EN, TX1EN that when activated is arranged to disable the high impedance state. The operations of the respective transmit enable inputs may be performed in a similar fashion as described with reference to FIG. 8 with the difference that triggering of the respective transmit enable inputs are managed by different time-scheme as described below.

The transmission system 140 is arranged to alternate between providing power from the first circuit FC to the second circuit SC and providing transmission of digital signals from the second circuit SC to the first circuit FC and providing digital signals from the first circuit FC to the second circuit SC. In order to alternate between transmission of digital signals and transmission of power, the transmission system 140 is arranged to implement a time-slot scheme. In this embodiment the time-slot scheme may be operated in a similar fashion to the time-slot scheme described with reference to FIG. 7 with the main difference that the time-slot scheme according to the embodiment with further reference to FIG. 9 is arranged to trigger switching from power transmission to either transmission of digital signals from the second circuit SC to the first circuit FC or transmission of digital signals from the first circuit FC to the second circuit SC. To control switching from power transmission to transmission of digital signals from the first or second circuit the first control unit may be arranged to cause the power driver circuit to transmit a second predetermined number of increases of current or voltage pulses in the secondary winding of the transformer in addition to the first predetermined number of increases of current or voltage pulses in the secondary winding of the transformer. The second predetermined number of increases in current or voltage pulses is different than said first predetermined number of increases or voltage pulses. The first control unit may be arranged to cause the power driver transmit either the first predetermined number of increases of current or voltage pulses or the second predetermined number of increases of current or voltage pulses during the at least one first portion of each time-slot of the number of consecutive time-slots. Thus, during each time slot of the number of consecutive time-slots the number of transmitted increases of current or voltage pulses indicates which of the first or second circuit that is allowed or expected to transmit digital signals.

As an example the first predetermined number of increases of current or voltage pulses in the secondary winding P2 of the transformer T1 may indicate that the first transmitter circuit TRS2 of the second circuit SC is allowed to transmit digital signals while the second transmitter circuit TRS1 is not allowed to transmit digital signals whereby the second transmit enable input TX2EN of the first digital transmitter TRS2 of the first transmitter circuit TRS2 is activated, the transmit enable input TX1EN of the second digital transmitter TRAN1 of the second transmitter circuit TRS1 is de-activated and whereby power transmission is halted.

The second predetermined number of increases of current or voltage pulses in the secondary winding P2 of the transformer T1 may indicate that the second transmitter circuit TRS1 of the first circuit FC is allowed to transmit digital signals while the first transmitter circuit TRS2 is not allowed to transmit digital signals whereby the transmit enable input TX2EN of the second digital transmitter TRAN1 of the second transmitter circuit TRS1 is activated, the transmit enable input TX2EN of the first digital transmitter TRS2 of the first transmitter circuit TRS2 is de-activated and whereby power transmission is halted.

The characteristics with regard to the first, second and/or the one or more additional predetermined number of voltage pulses caused by the power driver circuit in the secondary winding P2 of the transformer T1 may be received by the second comparator COMP2 so as to enable the second circuit SC to count said voltage pulses. The pulses may for example be counted by the second control unit coupled to the second circuit SC. This enables the second circuit SC to detect when the second circuit is arranged to perform transmission of digital signals or when to receive transmission of digital signals. The first control unit of the first circuit FC is arranged to cause transmission of power and thereby also control the characteristics with regard to the first, second and/or the one or more additional predetermined number of voltage pulses caused by the power driver circuit PWRD in the secondary winding P2 of the transformer T1 means of controlling the switch SW of the power driver circuit PWRD. This means that the first circuit act as master.

This means that the first control unit of the first circuit is able to control if power is to be transmitted or if digital signals are to be transmitted from the second or first circuit by means of adapting the control signal applied to the switch SW of the power driver circuit PWRD. The first control unit may for example adapt the control signal applied to the switch SW differently for different time-slots of the number of consecutive time-slots so as to cause providing the first or second predetermined number of increases in current in each time-slot. This results in that power is transmitted during the at least one first portion of each time slot and that digital signals are transmitted from the first or second circuit during the at least one second portion of each time-slot depending on if the control unit provides the first or second predetermined number of increases of current during the at least first portion of a time-slot.

Different types of trigger signals may also be implemented so as to indicate a type of digital signals to be transmitted. The different types of trigger signals may for example indicate that control commands or measurement data are to be transmitted. The different types of trigger signals may be implemented by means of the first control unit in addition to providing the first or second predetermined number of increases of current or voltage pulses in the secondary winding P2 of the transformer T1 is arranged to cause a one or more of additional predetermined increases of current or voltage pulses in the secondary winding P2 of the transformer T1. Said one or more additional predetermined increases of current or voltage pulses in the secondary winding P2 of the transformer T1 is different than the first or second predetermined number of increases of current or voltage pulses in the secondary winding P2 of the transformer T1.

In addition, the power driver circuit PWRD preferably comprise a snubber circuit (not shown) in order to protect the second digital transmitter TRAN1 of the second transmitter circuit TRS1 when the switch SW of the power driver circuit PWRD is turned off, which may lead to voltage spikes potentially damaging to the second digital transmitter TRAN1 of the first circuit and/or the switch SW of the power driver circuit PWRD. Apart from protecting said second digital transmitter TRAN1 and/or said switch SW from voltage spikes, the snubber circuit further introduces resonance with respect to switching power on and off to the primary winding P1 of the transformer T1 using the switch SW, which resonance increases the efficiency of power transmission. Said snubber circuit may be constructed using an RC circuit, i.e. a circuit including at least one resistor and at least one capacitor, such as a resistor in series with a capacitor. Alternatively said snubber circuit may be constructed using a diode, such as a transient voltage suppression diode. The snubber circuit may further be provided with a disable/enable switch (not shown) to provide means for disabling the snubber circuit during data transmission and enabling the snubber circuit during power transmission. Introducing the disable/enable switch associated with the snubber circuit is beneficial since having the snubber circuit active during data transmission may cause problems with data transmission due to the fact that introduction of a low impedance in the first circuit may cause the snubber circuit to adversely influence the operations of the first circuit during data transmission. Said disable/enable switch may be controlled using a controller such as the first control unit described with reference to FIG. 7 wherein the first control unit may be a processor or microcontroller associated with the first circuit, such a processor or microcontroller may for example form part of the control unit 22 of the power tool embodiments illustrated in FIGS. 2 and 3. With further reference to FIG. 9 the control of the disable/enable switch may be performed in accordance with the above described time-scheme.

By providing alternating bi-directional transmission of digital signals from the second circuit SC over the non-contact interface NCI to the first circuit FC and from the first circuit FC over the non-contact interface NCI to the second circuit SC and transmission of power from the first circuit over the non-contact interface NCI to the second circuit, the need for signal transmission cabling between the first and second circuit and a power supply dedicated to the second circuit is eliminated. Furthermore, there is no need for a plurality of transformers with associated circuits is for accomplishing half-duplex bi-directional transmission of digital signals alternated with power transmission. This is particularly advantageous in cases where the second circuit SC is integrated in a rotary device that rotates in relation to the first circuit FC, e.g. if the second circuit SC together with the secondary winding P2 is applied to or integrated into the rotating device 5 of the exemplary transmission system illustrated in FIG. 1 or if the second circuit together with the secondary winding P2 of the transformer T1 is integrated in or applied to a rotating component such as the drive shaft 32 of the exemplary power tools 20 and 40 illustrated in FIGS. 2 and 3, since it eliminates the need of transmission cabling for transmission of digital signals and power attached to the rotary device and since it provides wireless a high data rate transmission using a minimal number of circuit components, and so minimizes the size, power consumption and complexity thereof.

With reference to FIG. 10 an illustration of a flow diagram of a method for performing transmission of signals from the second circuit SC of the transmission system 90, 100, 110, 120, 130, 140 with reference to one or more of FIG. 5 to FIG. 9 through a non-contact interface NCI to the first circuit FC of the transmission system according to an embodiment of the present invention is provided.

In a first method step S200 a first digital input signal TX2 is provided via a first series resistor R2 to a secondary winding P2 of a transformer T1 to form one or more voltage pulses taking a positive or negative form. In more detail the first digital input signal TX2 is provided by a first digital transmitter TRAN2 of the second circuit SC via the first series resistor R2 to the secondary winding P2 of the transformer, whereby the one or more voltage pulses W2 take a positive or negative form based on if the first digital input signal has a positive or negative edge. After the method step S200 a subsequent method step S210 is performed.

In the method step S210 one or more induced voltage pulses W3 are received. In more detail the one or more induced voltage pulses W3 are received by the first comparator COMP1 of the first circuit FC from a primary winding P1 of the transformer T1. Wherein the one or more induced voltage pulses W3 in the primary winding P1 of the transformer are induced by the one or more voltage pulses in the secondary winding P2 of the transformer T1 by means of the inductive characteristics of the transformer T1. After the method step S210 a subsequent method step S220 is performed.

In the method step S220 a first digital output signal RX1 is provided. In more detail the first digital output signal RX1 is provided reflecting the first digital input signal W1 based on the one or more induced voltage pulses W3. The first comparator COMP1 provides the first digital output signal reflecting the first digital input signal based on exploiting the negative or positive form of the one or more induced voltage pulses. After the method step S220 the method may end or be repeated from the step S200 for form a new round of transmission of digital signals from the second circuit SC to the first circuit FC.

An additional method step S230 (not shown) may be performed. In the method step S230 a hysteresis is added to the first comparator COMP1. In more details the hysteresis is added to the first comparator COMP1 so as to introduce separate switching points of the first comparator for the one or more voltage pulses having a positive form and for the one or more voltage pulses having a negative form.

Yet an additional method step S240 (not shown) may be performed.

In the method step S240 a second digital input signal TX1 is provided via a second series resistor R1 to the primary winding P1 of the transformer T1 to form one or more voltage pulses taking a positive or negative form. In more detail the second digital input signal TX1 is provided by a second transmitter TRAN1 of the first circuit FC via the second series resistor R1 to the secondary winding P2 of the transformer, whereby the one or more voltage pulses taking a positive or negative form based on if the second digital input signal has a positive or negative edge. After the method step S240 a subsequent method step S250 (not shown) is performed.

In the method step S250 one or more induced voltage pulses are received. In more detail the one or more induced voltage pulses are received by the second comparator COMP2 of the second circuit SC from the secondary winding P2 of the transformer T1. Wherein the one or more induced voltage pulses in the secondary winding P2 of the transformer T1 are induced by the one or more voltage pulses in the primary winding P1 of the transformer T1 by means of the inductive characteristics of the transformer T1. After the method step S250 a subsequent method step S260 (not shown) is performed.

In the method step S260 a second digital output signal RX2 is provided. In more detail the first digital output signal is provided reflecting the second digital input signal TX1 based on the one or more induced voltage pulses. The second comparator COMP2 provides the second digital output signal reflecting the second digital input signal based on exploiting the negative or positive form of the one or more induced voltage pulses. After the method step S260 the method may end or be repeated from the step S240 for form a new round of transmission of digital signals from the first circuit FC to the first circuit SC.

Yet an additional method step S270 (not shown) may be performed.

In the method step S270 the transmitter circuit TRS2, TRS1 of the second SC and/or first circuit FC is set in high impedance state. In more detail the transmitter circuit TRS2, TRS1 of the second and/or first circuit is set in high impedance state when not transmitting digital signals. The transmitter circuit TRS2, TRS1 of the second SC and/or first circuit FC may be set in high impedance state using tri-state logic associated with the first and second digital transmitter TRAN2, TRAN1 of the respective transmitter circuits TRS2, TRS1. After at least one of the transmitter circuit TRS2, TRS1 has been set in high impedance state a transmit enable input TX2EN, TX1EN of the at least one digital transmitter TRAN2, TRAN1 may be set to active whereby the high impedance state is disabled so as to enable transmitting digital signals from the at least one digital transmitter.

Yet an additional method step S280 (not shown) may be performed. In the method step S280 power is transmitted through the non-contact interface NCI. The method step S280 may be repeated such as repeated cyclically in order to provide a stable supply of power through said non-contact interface NCI.

Yet an additional method step S290 (not shown) may be performed. In the method step S290 transmission of power from the first circuit FC to the second circuit SC and transmission of digital signals at least from the second circuit SC to the first circuit FC is alternated.

The above described method and associated method steps may be used in conjunction with a power tool such as the power tool 20, 40 described with reference to FIG. 2 and FIG. 3. This involves that at least one of a number of additional method steps is performed. Said number of additional method steps comprising a method step S300 (not shown), a method step S310 (not shown) and a method step S320 (not shown).

In the method step S300 digital signals is transmitted from a rotary device of the power tool to a stationary control unit 22 of the power tool. In more detail digital signals such as digital sensor signals, error messages and/or device from at least one sensor 30 coupled to the rotating drive shaft 32, the tool piece 31 or the rotor 28 of the power tool is transmitted to the stationary control unit 22 of the power tool 20, 40. The digital sensor signals may for example be transmitted to the control unit 22 so as to enable the control unit 22 to process the digital sensor signals and control/monitor the power tool 20, 40 using said processed digital sensor signals. The at least one sensor 30 may be at least one torque sensor. After the method step S300 a subsequent method step S310 (not shown) is performed.

In the method step S310 control signals from the stationary control unit 22 of the power tool 20, 40 is transmitted to the rotary device of the power tool 20, 40. In more detail control signals such as digital control signals from the stationary control unit 22 of the power tool 20, 40 is transmitted to the at least one sensor 29 coupled to the rotary device such as the rotating drive shaft 32, the tool piece 31 or the rotor 28 of the power tool so as to enable controlling the operations of the at least one sensor and associated circuit and/or controller.

In the method step S320 power is transmitted from a stationary power source 21 of the power tool 20, 40 to a sensor 30 of the rotary device of the power tool 20, 40. In more detail the electronic component of the rotary device may be the at least one sensor 30 and associated controller and/or circuit coupled to the rotating device such as the rotor 28, the tool piece 31 or the drive shaft 32 of the power tool 20, 40 so as to enable powering the at least one sensor 29 and associated controller and/or circuit.

The present invention support communication of digital signals at data rates in an interval from 1 bit/s up to at least 15 Mbit/s, such as for example 10 Mbit/s. The bit rate is dependent of time constants associated with the series resistances R1, R2 and the inductance of the windings P1, P2.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A bi-directional transmission system, for transmission of signals through a non-contact interface (NCI), comprises a transformer (T1) inductively coupling a first circuit (FC) to a second circuit (SC) through the non-contact interface (NCI), wherein:
the second circuit (SC) comprises a first transmitter circuit (TRS2) including a first digital transmitter (TRAN2) arranged to provide a first digital input signal (TX2) via a first resistor (R2) to a first winding (P2) of the transformer (T1), whereby at least one voltage pulse (W2) is formed in the first winding (P2), and wherein the at least one voltage pulse (W2) takes a positive or negative form based on whether a first digital input signal (W1) has a positive or negative edge; and
the first circuit (FC) comprises a first receiver circuit (RE1) including a first comparator (COMP1) arranged to receive at least one induced voltage pulse (W3) from the second winding (P1) of the transformer (T1), induced by the at least one voltage pulse (W2) in the first winding (P2), and to provide a first digital output signal (RX1) reflecting the first digital input signal (TX2) based on the at least one induced voltage pulse (W3);

the first circuit (FC) further comprises a second transmitter circuit (TRS1) including a second digital transmitter (TRAN1) arranged to provide the second digital input signal (TX1) via a second resistor (R1) to the second winding (P1) of the transformer (T1), whereby at least one voltage pulse (W2) is formed in the second winding (P1), and wherein the at least one voltage pulse (W2) takes a positive or negative form based on whether the second digital input signal (TX1) has a positive or negative edge; and
the second circuit (SC) further comprises a second receiver circuit (RE2) including a second comparator (COMP2) arranged to receive at least one induced voltage pulse from the first winding (P2) of the transformer (T1), induced by at least one voltage pulse in a second winding (P1) of the transformer (T1), and to provide a second digital output signal (RE2) reflecting a second digital input signal (TX1) based on the at least one induced voltage pulse; and
at least one of the first digital transmitter (TRAN2) and the second digital transmitter (TRAN1) comprises:
tri-state logic to enable the at least one of the first (TRAN2) and second (TRAN1) digital transmitters to assume a high impedance state when not transmitting signals; and
a transmit enable input (TX2EN, TX1EN) for disabling the high impedance state when transmitting digital signals.

2. The transmission system according to claim 1, wherein the first comparator (COMP1) comprises an integrated hysteresis so as to introduce separate switching points for the at least one induced voltage pulse (W3) having a positive form and for the at least one induced voltage pulse (W3) having a negative form.

3. The transmission system according to claim 1, wherein at least one of the first digital transmitter (TRAN2) and the second digital transmitter (TRAN1) comprises a logic buffer.

4. The transmission system according to claim 1, wherein the transmission system is arranged for transmission of power through the non-contact interface (NCI).

5. The transmission system according to claim 4, wherein the transmission system is arranged to alternate between transmission of power from the first circuit (FC) to the second circuit (SC), and transmission of digital signals from at least the second circuit (SC) to the first circuit (FC).

6. The transmission system according to claim 5, wherein the transmission system is arranged to alternate between transmission of digital signals and transmission of power based on a time-slot scheme.

7. The transmission system according to claim 6, wherein the transmission system is arranged to switch back and forth from transmission of power to transmission of digital signals based on the characteristics of at least one power pulse transmitted during transmission of power over the non-contact interface (NCI).

8. The transmission system according to claim 4, wherein the first circuit (FC) comprises a power driver circuit (PWRD), said power driver circuit (PWRD) comprising:
a first switch (SW) for switching on and off a voltage to the primary winding (P1) of the transformer (T1) during transmission of power from the first circuit (FC) to the second circuit (SC); and
a snubber circuit to protect at least one of the second digital transmitter (TRAN1) and the first switch (SW) of the first circuit (FC) from voltage spikes when said switch is turned off.

9. The transmission system according to claim 8, wherein the power driver circuit (PWRD) further comprises a second switch for disabling the snubber circuit during transmission of digital signals from the second circuit (SC) to the first circuit (FC), and enabling the snubber circuit during transmission of power from the first circuit (FC) to the second circuit (SC).

10. The transmission system according to claim 8, wherein the snubber circuit comprises at least one of:
an RC circuit comprising at least one resistor and at least one capacitor; and
a diode, such as a transient voltage suppression diode.

11. The transmission system according to claim 4, wherein the non-contact interface (NCI) is a rotating non-contact interface and wherein the transformer (T1) is a rotary transformer.

12. The transmission system according to claim 4, wherein the second circuit (SC) is integrated in a rotary device that rotates in relation to the first circuit (FC), and wherein the second circuit (SC) is coupled to at least one electric component of the rotary device for transmission of signals between the at least one electric component and the first circuit (FC).

13. The transmission system according to claim 12, wherein the at least one electric component comprises a torque sensor for measuring a torque of the rotary device.

14. A power tool comprising the transmission system according to claim 4.

15. The power tool according to claim 14, wherein a stationary component of the power tool comprises the first circuit (FC) of the transmission system, and a rotary component of the power tool comprises the second circuit (SC) of the transmission system, so as to enable transmission of signals between the stationary component and the rotary component.

16. A method for wireless bi-directional transmission of signals between a first circuit (FC) and a second circuit (SC) inductively coupled to each other through a non-contact interface (NCI) by means of a transformer (T1), said method comprising:
providing, by means of a first digital transmitter (TRAN2) of the second circuit (SC), a first digital input signal (TX2) via a first resistor (R2) to a first winding (P2) of the transformer (T1) to form at least one voltage pulse (W2) in the first winding (P2), the at least one voltage pulse (W2) taking a positive or negative form based on whether the first digital input signal (TX2) has a positive or negative edge;
receiving, in a first comparator (COMP1) of the first circuit (FC), at least one induced voltage pulse (W3) from a second winding (P1) of the transformer (T1), induced by the at least one voltage pulse (W2) in the first winding (P2);
providing a first digital output signal (RX1) reflecting the first digital input signal (TX2) based on the at least one induced voltage pulse (W3);
providing, by means of a second digital transmitter (TRAN1) of the first circuit (FC), a second digital input signal (TX1) via a second resistor (R1) to the second winding (P1) of the transformer (T1) to form at least one voltage pulse in the second winding (P1), the at least one voltage pulse taking a positive or negative form based on whether the second digital input signal (TX1) has a positive or negative edge;
receiving, in a second comparator (COMP2) of the second circuit (SC), at least one induced voltage pulse from the first winding (P2) of the transformer (T1), induced by the at least one voltage pulse in the second winding (P1);
providing a second digital output signal (RX2) reflecting the second digital input signal (TX1) based on the at least one induced voltage pulse; and
setting a transmitter circuit (TRS2, TRS1) of at least one of the second circuit (SC) and the first circuit (FC) in a high impedance state when not transmitting digital signals.

17. The method according to claim 16, further comprising applying a hysteresis to the first comparator (COMP1) so as to introduce separate switching points for the at least one induced voltage pulse (W3) having a positive form and for the at least one voltage pulse (W3) having a negative form.

18. The method according to claim 16, further comprising transmitting power through the non-contact interface (NCI).

19. The method according to claim 16, further comprising alternating between transmission of power from the first circuit (FC) to the second circuit (SC), and transmission of digital signals from at least the second circuit (SC) to the first circuit (FC).

20. The method according to 16, wherein the method is used for at least one of:
transmission of digital signals from a sensor of a rotary device of a power tool to a stationary control unit of the power tool;
transmission of digital signals from the stationary control unit of the power tool to the sensor of the rotary device of the power tool; and
transmission of power from a stationary energy source of the power tool to the sensor of the rotary device of the power tool.

* * * * *